(12) United States Patent
Bachelder et al.

(10) Patent No.: US 10,032,058 B2
(45) Date of Patent: Jul. 24, 2018

(54) DECODING BARCODES

(71) Applicant: COGNEX CORPORATION, Natick, MA (US)

(72) Inventors: Ivan Bachelder, Hillsborough, NC (US); James A. Negro, Arlington, MA (US); Shekhar Sastry, Waltham, MA (US); Yael Steinsaltz, Framingham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/470,470

(22) Filed: Mar. 27, 2017

(65) Prior Publication Data

US 2017/0372107 A1   Dec. 28, 2017

Related U.S. Application Data

(63) Continuation of application No. 14/510,710, filed on Oct. 9, 2014, now Pat. No. 9,607,200.

(51) Int. Cl.
*G06K 7/10* (2006.01)
*G06K 7/14* (2006.01)

(52) U.S. Cl.
CPC ......... *G06K 7/1452* (2013.01); *G06K 7/1413* (2013.01); *G06K 7/1439* (2013.01)

(58) Field of Classification Search
CPC ...... G06K 7/10; G06K 7/1413; G06K 7/1452; G06K 7/1439
USPC ...................................... 235/462.01–462.49
See application file for complete search history.

(56) References Cited

U.S. PATENT DOCUMENTS

| 5,398,770 | A | 3/1995 | Harden |
| 5,486,689 | A | 1/1996 | Ackley |
| 5,514,858 | A | 5/1996 | Ackley |
| 5,539,191 | A | 7/1996 | Ackley |
| 6,102,292 | A | 8/2000 | Zocca et al. |
| 9,607,200 | B2 * | 3/2017 | Bachelder ............ G06K 7/1452 |
| 2003/0066891 | A1 | 4/2003 | Madej et al. |
| 2006/0266836 | A1 | 11/2006 | Bilcu et al. |
| 2016/0104022 | A1 | 4/2016 | Bachelder et al. |

FOREIGN PATENT DOCUMENTS

CN   103339641 A   10/2013

OTHER PUBLICATIONS

Chinese Office Action dated Dec. 18, 2017 in connection with Chinese Application No. 201510670047.3 and English translation thereof.

(Continued)

*Primary Examiner* — Daniel Hess
(74) *Attorney, Agent, or Firm* — Wolf, Greenfield & Sacks, P.C.

(57) ABSTRACT

Systems and methods are provided for decoding barcodes. A scan signal is acquired along a scan through a barcode. A first character unit grid for a unit width pattern within the barcode along the scan is determined. At least one set of sampling coefficients relating the unit width pattern to a portion of the scan signal is determined based on the first character unit grid. The element width pattern for the unit width pattern is determined based on the at least one set of sampling coefficients and the portion of the scan signal.

22 Claims, 22 Drawing Sheets

(56) References Cited

OTHER PUBLICATIONS

Gallo et al., Reading 1D Barcodes with Mobile Phones Using Deformable Templates. IEEE Transactions on Pattern Analysis and Machine Intelligence. Sep. 2011;33(9):1-10.
Esedoglu, Blind Deconvolution of Bar Code Signals. Inverse Problems. 2004;20(1):1-19.

* cited by examiner

102A 152   154

156   158

DECODING BARCODES

TECHNICAL FIELD

Embodiments of the invention generally relate to decoding barcodes.

BACKGROUND

Barcodes are often used to encode information for various purposes, such as automated part identification. A barcode can be a two-dimensional (e.g., usually rectangular) identifying symbol that includes one or more spatially contiguous sequences of alternating parallel bars and spaces. Each of the bars and spaces is often referred to as an element. A sequence of one or more contiguous elements makes up an element sequence. An element in a barcode element sequence can encode information by its relative width.

Typically, barcodes are created by printing (e.g., with ink) or marking (e.g., by etching) bar elements upon a uniform reflectance substrate (e.g. paper or metal). The bars typically have a lower reflectance than the substrate, and therefore appear darker than the spaces between them (e.g., as when a barcode is printed on white paper using black ink). But barcodes can be printed in other manners, such as when a barcode is printed on a black object using white paint. To differentiate a barcode more readily from the background, the bars are typically placed relatively distant from other printing or visible structures. Such distance creates a space, often referred to as a quiet zone, both prior to the first bar and after the last bar. Alternatively, the spaces and quiet zones can be printed or marked, and the bars are implicitly formed by the substrate.

However, readers often have difficulty decoding barcodes that are under-resolved, such as barcodes that are under-sampled (e.g., due to low sampling rates or low resolution sensors) and/or blurred (e.g., due to poor focus of the reader, or the effects of motion).

SUMMARY OF THE INVENTION

The techniques described herein provide for decoding under-resolved barcodes, such as barcodes that are under-sampled and/or blurred. The local reflectance for a scan sample can be modeled by assuming the local reflectance is a result of integrating the area under the actual barcode reflectance profile that falls within a corresponding scan sample bin. Other modeling techniques can also be used, such as a weighted summation, where profile values closer to the scan sample bin center might contribute more to the overall reflectance.

In some aspects, a computerized method for decoding a barcode is provided. The method includes receiving, by a computing device, data from a sensor indicative of a scan signal along a scan through a barcode. The method includes determining, by the computing device, a first character unit grid for a unit width pattern within the barcode along the scan. The method includes determining, by the computing device, based on the first character unit grid, at least one set of sampling coefficients relating the unit width pattern to a portion of the scan signal. The method includes determining, by the computing device, an element width pattern for the unit width pattern based on the at least one set of sampling coefficients and the portion of the scan signal.

In some aspects, a barcode reader for decoding a barcode is provided. The barcode reader includes a processor configured to run a module stored in memory that is configured to cause the processor to receive data from a sensor indicative of a scan signal along a scan through a barcode. The module stored in memory is configured to cause the processor to determine a first character unit grid for a unit width pattern within the barcode along the scan. The module stored in memory is configured to cause the processor to determine, based on the first character unit grid, at least one set of sampling coefficients relating the unit width pattern to a portion of the scan signal. The module stored in memory is configured to cause the processor to determine an element width pattern for the unit width pattern based on the at least one set of sampling coefficients and the portion of the scan signal.

In some aspects, a non-transitory computer readable medium is provided. The non-transitory computer readable medium has executable instructions operable to cause an apparatus to receive data from a sensor indicative of a scan signal along a scan through a barcode. The executable instructions are operable to cause an apparatus to determine a first character unit grid for a unit width pattern within the barcode along the scan. The executable instructions are operable to cause an apparatus to determine based on the first character unit grid, at least one set of sampling coefficients relating the unit width pattern to a portion of the scan signal. The executable instructions are operable to cause an apparatus to determine an element width pattern for the unit width pattern based on the at least one set of sampling coefficients and the portion of the scan signal.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
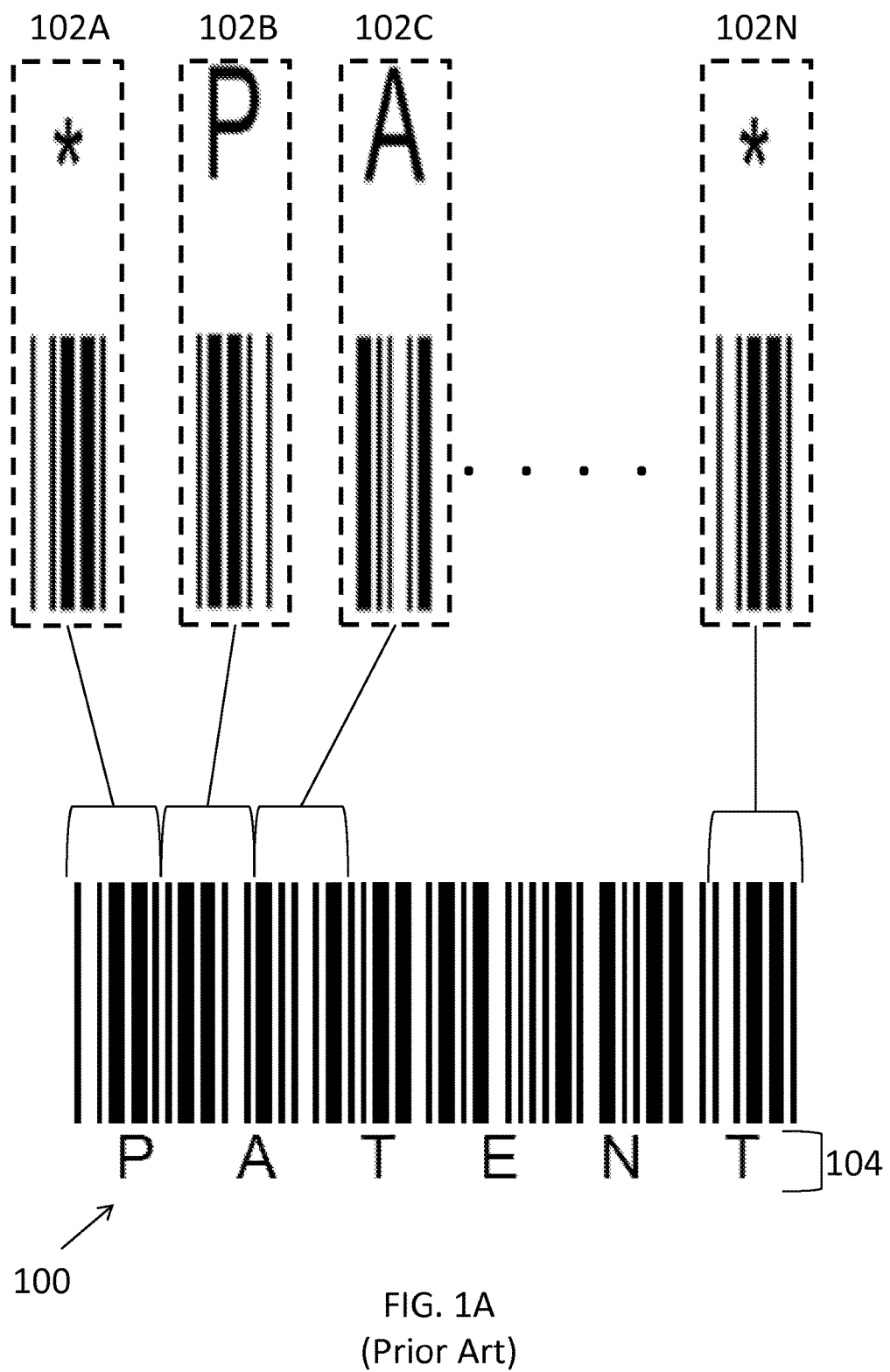
FIG. 1A illustrates a barcode generated using a two-width symbology.

The techniques described herein use a model of the quantization effects of sampling (e.g., including dramatic under-sampling) to decode under-resolved barcodes. In some embodiments, the model can be generated by approximating the effective scan sampling area width along the scan for a particular scan sample by a scan sample bin. A scan sample bin can be a range of positions along the scan over which reflectance information is assumed to have been integrated for that scan sample. In some embodiments, the scan sampling bin has a width equal to the scan sampling pitch and is centered on the scan sample position, such that all of the scan sample bins collectively cover the area of the scan without overlapping. One of skill in the art will appreciate that other sample bin widths are also possible.

In some embodiments, the local reflectance for a scan sample can be modeled by assuming the local reflectance is a result of integrating the area under the actual barcode reflectance profile that falls within corresponding scan sample bin. Other modeling techniques can also be used, such as a weighted summation, where profile values closer to the scan sample bin center might contribute more to the overall reflectance.

Any one of a number of barcode designs, called symbologies, can be used for a barcode. Each symbology can specify bar, space, and quiet zone dimensional constraints, as well as how exactly information is encoded. Examples of barcode symbologies include Code 128, Code 93, Code 39, Codabar, I2of5, MSI, Code 2 of 5, and UPC-EAN. Barcodes can include traditional "linear" symbologies (e.g., Code 128 and Code 39), where all of the information is encoded along one dimension. Barcodes can also include individual rows of "stacked" 2D symbols (e.g., DataBar, PDF417, MicroPDF, and the 2D components of some composite symbols), all of which essentially allow barcodes to be stacked atop one another to encode more information.

Many barcode symbologies fall into two categories: two-width and multiple-width symbologies. Examples of two-width symbologies include, for example, Code 39, Interleaved 2 of 5, Codabar, MSI, Code 2 of 5, and Pharmacode. Each element of a two-width symbology is either narrow or wide. A narrow element has a width equal to the minimum feature size, X. A wide element has a width equal to the wide element size, W. The wide element size W is typically a fixed real multiple of the minimum feature size. Two-level symbologies thereby allow each element to represent one of two possible values, X or W.

Multiple-width symbologies include, for example, Code 128, Code 93, UPC-EAN, PDF417, MicroPDF, and DataBar. Each element of a multiple-width symbology is an integer multiple, n, of the minimum feature size (e.g., where n is an integer between 1 and the maximum width of an element, which can depend on the symbology). The term module is often used to refer to the minimum feature size of a multi-level barcode, such that each element of a multi-level barcode symbol is made up of an integer number of modules. For many multiple-width symbologies (e.g., such as Code 128, Code 93, and UPC-EAN), n ranges between 1 and 4, but can be much larger (e.g., as with DataBar, where n can range between 1 and 9).

The data for any element sequence in a two- or multiple-width barcode is encoded by a corresponding sequence of quantized element widths. The sequence of element widths for an element sequence is often referred to as the element width pattern of an element sequence. The element width pattern for a two-width element sequence is a binary pattern consisting of narrow ('X') and wide ('W') elements. For example, the element width pattern for a bar (W), space (X) bar (X), space (X), bar (X), space (W), bar (X), space (X) and bar (W), where X is the minimum feature size and W is the wide element width, is represented as WXXXXWXXW. The element width pattern for a multiple-width element sequence is a pattern of integers indicating the width in modules for each corresponding element in the sequence. For example, the element width pattern for a bar (n=1), space (n=1), bar (n=1), space (n=3), bar (n=2), space (n=3) is represented as 111323.

Barcode elements are often grouped into sequential characters (e.g., letters and numbers) that can be decoded from their respective elements into alpha-numeric values. In some embodiments, the data is determined directly from the entire sequence of element widths (e.g., Pharmacode barcodes). The possible characters that can be encoded for any particular symbology is referred to as its character set. Depending on the symbology, there are several different types of characters in a character set, including delimiters and data characters. Typically, there are just a few different possible delimiter character patterns, but a large number of possible data character element width patterns. It is the string of data character values, represented from one end of the barcode to the other, that largely define the encoded string for the entire barcode.

Delimiter characters, sometimes called guard patterns, often occur at the beginning and end of the barcode. Delimiter characters can be used to allow readers to, for example, detect the symbol, determine where to start and stop reading, and/or determine the symbology type. Delimiter characters placed at the beginning and end of the barcode are often called start and stop characters, respectively. Some symbologies (e.g. UPC-A and DataBar) also have delimiter patterns within the symbol, delineating sections of the data characters. Finally, some symbologies (e.g. Code 128) have different start delimiters that determine how to interpret the data characters.

Data characters are the characters that encode the actual information in the barcode. The element width pattern for a data character is associated with an alpha-numeric value. A special data character called the checksum character is often also specified. The value of this character is essentially a sum of the values of all of the other data characters, allowing a reader to detect a misread string. The sequence of alpha-numeric value for all of the data characters form a raw string that is then converted, sometimes using special formatting rules, into the actual encoded set of elements for the barcode.

Regardless of type, each character value of a character set is associated with a unique element width pattern. For example, the element width patterns for an 'A' and 'B' in the Code 39 character set are WXXXXWXXW and XXWXX-WXXW, respectively. As explained above, the element width pattern WXXXXWXXW for 'A' is therefore a bar (W), space (X) bar (X), space (X), bar (X), space (W), bar (X), space (X) and bar (W) where X is the minimum feature size and W is the wide element width. The element width patterns for 'A' and 'B' in the Code 128 character set are 111323 and 131123, respectively.

It is important to note that, for most symbologies, all characters of a particular type have the same physical width in the barcode. For example, characters of two-width symbologies usually have constant numbers of narrow bars, narrow spaces, wide bars, and wide spaces, and typically begin with a bar element. Characters for certain two-width symbologies (e.g. Code39) also end with a bar, and separate individual characters using a special space called an inter-character gap of consistent, but arbitrary width. Such symbologies with inter-character gaps between characters are generally referred to as discrete symbologies, while symbologies without such gaps are referred to as continuous symbologies. In contrast, multiple-width symbology characters often have a fixed number of total modules that are each exactly one module wide, have a fixed number of bars and spaces, and typically begin with a bar and end with a space (and therefore have no inter-character gap).

FIG. 1A illustrates a barcode 100 generated using two-width symbology Code 39. Barcode 100 contains a set of element sequences 102A, 102B, 102C through 102N (collectively referred to herein as element sequence 102). The set of element sequences encode the string PATENT 104. Each letter in the string PATENT 104 is encoded using a data character, such as element sequence 102B that encodes data character P and element sequence 102C that encodes data character A. Element sequences 102A and 102N encode the delimiter character, indicated with *. Therefore element sequences 102A and 102N mark the beginning and the end of the barcode 100. As shown in FIG. 1A, each element sequence 102 has the same physical width in the barcode 100.

Figure 1B:
FIG. 1B illustrates the dimensions of a two-width symbology.
Figure 1B:
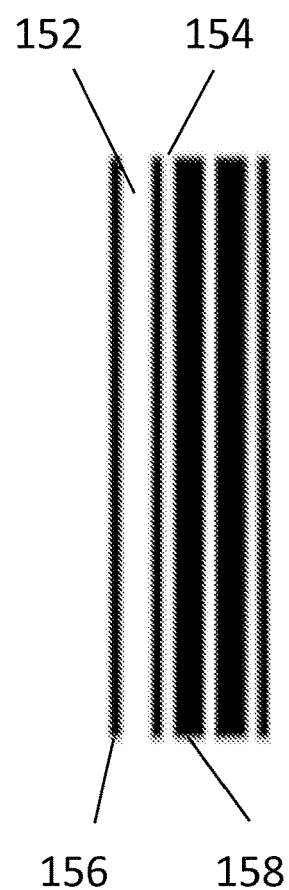

FIG. 1B is an enlarged view of element sequence 102A. Element sequence 102A includes element 154, which is a space with the minimum feature size X. Element sequence 102A includes element 152, which is a space with the wide element size W. Element sequence 102A includes element 156, which is a bar with the minimum feature size X. Element sequence 102A includes element 158, which is a bar with the wide element size W.

Figure 2:
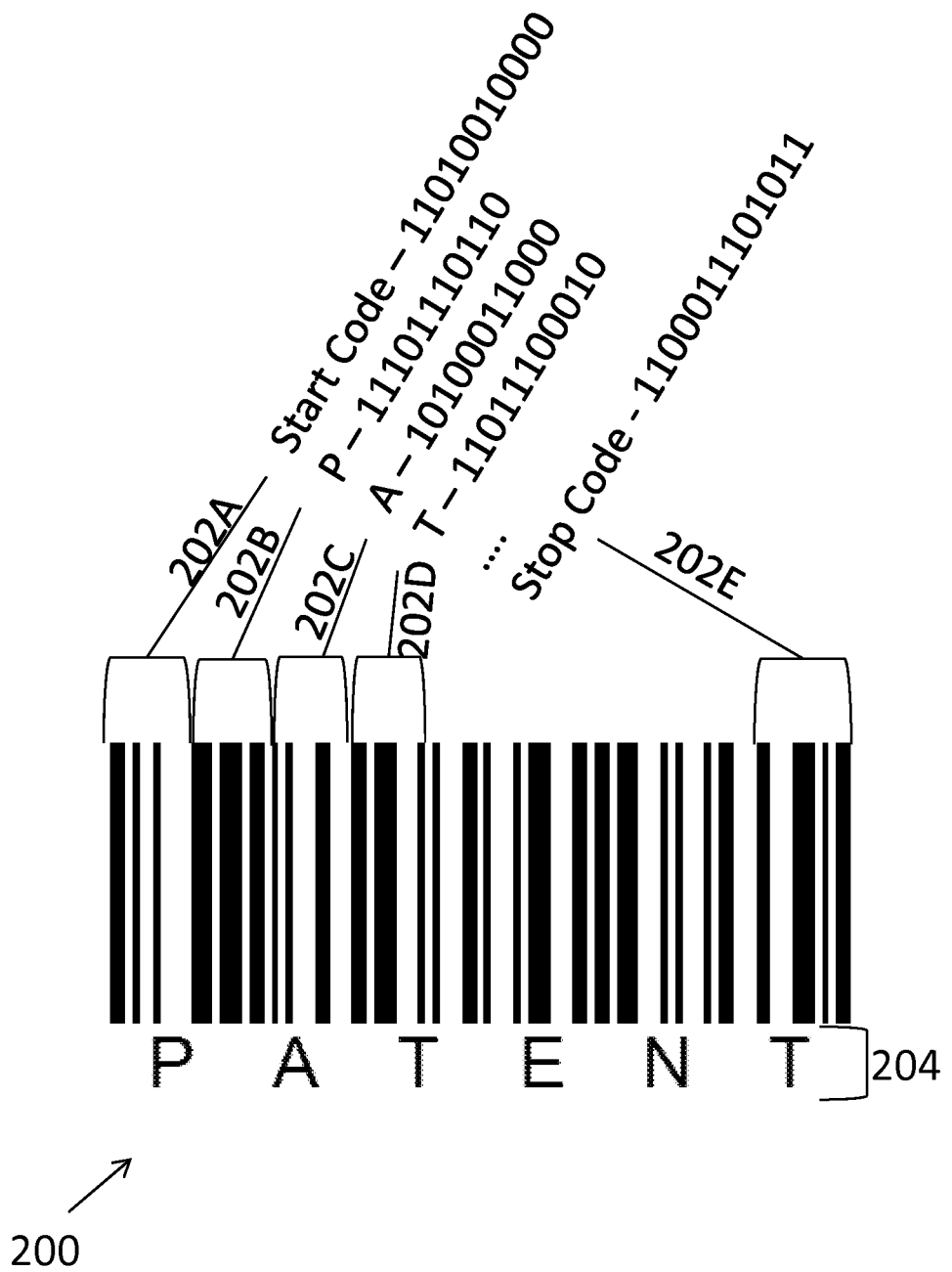
FIG. 2 illustrates a barcode generated using a multiple-width symbology.

FIG. 2 illustrates a barcode 200 generated using multiple-width symbology Code 128. Barcode 200 contains a set of element sequences 202A, 202B, 202C, 202D through 202E (collectively referred to herein as character sequence 202). The set of element sequences encode the string PATENT 204. Like with FIG. 1A, each letter in the string PATENT 204 is encoded using a data character, such as element sequence 202B that encodes data character P and element sequence 202C that encodes data character A. Element sequence 202A encodes the start delimiter sequence for the barcode 200. Element sequence 202E encodes the stop delimiter sequence for the barcode 200. Therefore delimiter element sequences 202A and 202E mark the beginning and the end of the barcode 200.

As shown in FIG. 2, each element sequence 202A-E has the same physical width in the barcode 200. FIG. 2 shows the element width patterns for character sequence 202. The element width pattern for the start delimiter character element sequence 202A is 11010010000. The element width pattern for the P data character element sequence 202B is 11101110110. The element width pattern for the A data character element sequence 202C is 10100011000. The element width pattern for the T data character element sequence 202D is 11011100010. The element width pattern for the stop delimiter character element sequence 202E is 1100011101011.

Barcode readers, which are devices for automatically decoding barcodes, generally fall into two categories: laser scanners or image-based readers. In either type of reader, decoding is typically performed by measuring the one-dimensional (1D) positions of the edges of the barcode elements along one or more scans passing through either the physical barcode, or through a discrete image of the barcode, from one end to the other. Each scan is typically a line segment, but can be any continuous linear contour.

For each barcode reader scan of a barcode, a discrete signal (e.g., often referred to as a scan signal) is first extracted. A scan signal typically consists of sequential sampled intensity measurements along the scan, herein called scan samples. Each scan sample can represent the measured reflectance (relative darkness or lightness, measured by reflected light) over a small area, or scan sample area, of the barcode, centered at the corresponding position along the scan. The pattern of scan sample positions along the scan is referred to here as a scan sampling grid. This grid is often nearly uniform, which means that the distance, or scan sampling pitch, between sample positions along the scan is effectively constant. The scan sampling pitch essentially determines the scan sampling resolution of the sampled signal, typically measured as the number of scan samples per module (where a module as used here is synonymous with the minimum feature size for two-width symbologies). However, it is possible that the effective scan sampling pitch actually changes substantially but continuously from one end of the scan to the other due to perspective effects caused by the barcode being viewed at an angle or being wrapped around an object that is not flat (e.g. a bottle).

The width of the scan sample area for each sample, relative to the scan sample pitch, can govern the amount of overlap between the samples along the scan. An increase in the overlap among samples can increase the blur of the scan signal. A decrease in the overlap among samples can increase the possibility of not measuring important features of the signal. The height of each scan sample area governs how much information is integrated perpendicular to the scan. A larger the height of a scan sample can result in sharper element edges in the signal when the scan is perpendicular to the bars (e.g., so that the scan can take advantage of the redundant information in the bars in the perpendicular direction). However, as the scan angle increases relative to the bar so that it is no longer perpendicular to the bar, the more blurred these edges may become.

For laser scanners, a scan signal is extracted by sampling over time the reflected intensity of the laser as it sweeps along the scan contour through the physical barcode (e.g., as the laser sweeps along a line through the barcode). Each sample area is essentially the laser "spot" at an instant in time. The shape of the laser spot is typically elliptical, with major axis oriented perpendicular to the scan, which can afford the sample area width and height tradeoffs mentioned previously. Since the signal being sampled is analog, the sampling rate over time can govern the resolution, or sampling pitch. The sampling rate over time for a laser may be limited, for example, by the resolving power of the laser (e.g., how well the small spot of the laser can be focused), the maximum temporal sampling rate, and/or the print quality of the barcode.

For image-based readers, a discrete image of the barcode is acquired, such as by using camera optics and an imaging sensor (e.g., a CCD array). The resulting image can be a 2D sampling of the entire barcode. Each image sample, or pixel, of that image is itself a measurement of the average reflectance of a small area of the barcode centered at the corresponding point in an image sampling grid. This grid is often uniform or nearly uniform, which means that the distance between image sample positions, or image sampling pitch, is constant. This sampling pitch essentially determines the image resolution, typically measured as the number of pixels per module ("PPM"). However, as with laser scanning, it is possible that the effective image sampling pitch actually changes substantially but continuously from one end of the barcode to the other due to perspective effects.

A scan signal can then be extracted for any scan over an image of the barcode by subsampling the image (e.g., sampling the already sampled signal) along the scan. The scan sampling pitch is determined by the sampling rate over space (e.g., not time, as with laser scanners). One of skill in the art can appreciate that there are many ways to perform this subsampling operation. For example, the image processing technique projection can be used for a scan line segment. For projection, the height of the projection essentially determines height of the scan sample area for each sample, integrating information perpendicular to the scan. As another example, the technique described in U.S. patent application Ser. No. 13/336,275, entitled "Methods and Apparatus for One-Dimensional Signal Extraction," filed Dec. 23, 2011, can be used, which is hereby incorporated by reference herein in its entirety. For example, the effective scan sample area for each scan sample can be elliptical, analogous to the elliptical spot size used in laser-scanners.

Figure 3:
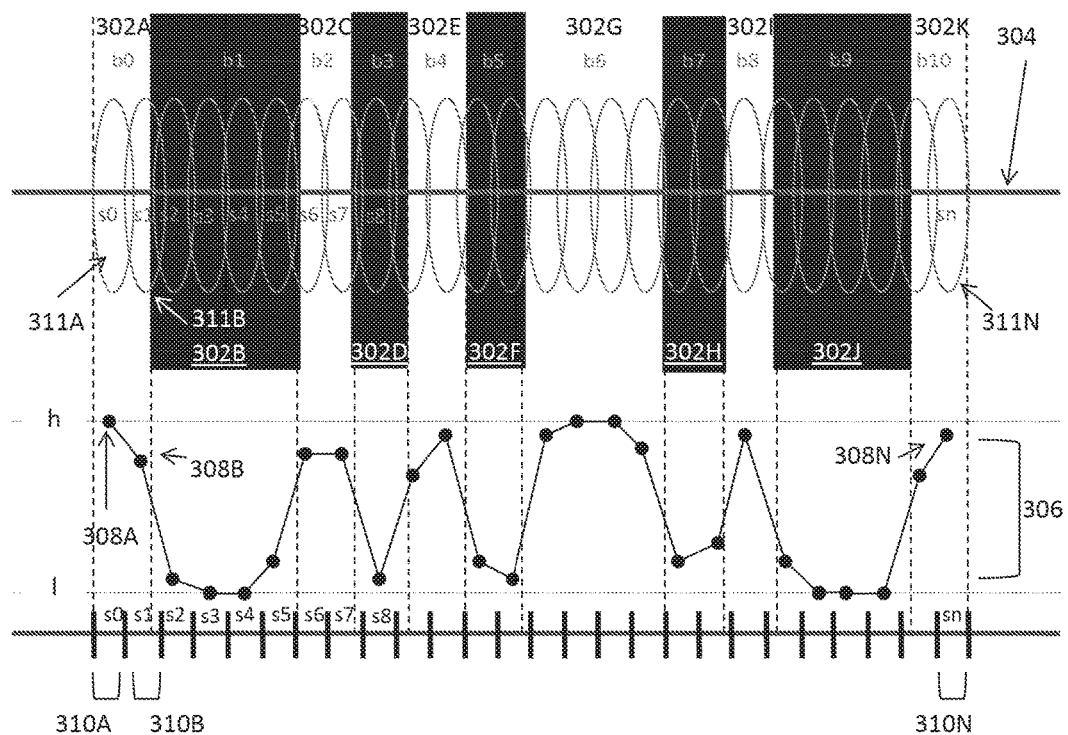
FIG. 3 illustrates an exemplary scan signal.

FIG. 3 illustrates an exemplary scan signal for an element sequence 302, which consists of barcode elements 302A-302K, collectively bar code elements. The scan 304 is perpendicular to the barcode elements 302. FIG. 3 shows the scan signal 306 derived from the scan 304. The scan signal 306 includes scan samples 308A, 308B through 308N, collectively referred to herein as scan samples 308. Each scan sample 308 represents the measured reflectance over a corresponding elliptical scan sample area s0 311A through sn 311N, within a 1D range along the scanline 304 corresponding to the scan sample bins s0 310A through sn 310N. For example, scan sample 308A represents the measured reflectance over scan sample area 311A, corresponding to scan sample bin 310A, scan sample 308B represents the measured reflectance over scan sample area 311B, corresponding to scan sample bin 310B, and scan sample 308N represents the measured reflectance over scan sample area 311N, corresponding to scan sample bin 310N. The scan sample 308A has a high reflectance indicated as "h" because the sample 310A is extracted by scan sample area 311A, which is entirely within space element 302A. The scan sample 308B has a lower reflectance because the sample area 308B is not entirely within a space element 302A, and is also integrating information from bar element 302B.

An important distinction from laser scanners, however, is that the sampling resolution of a scan signal extracted using an image-based reader is inherently limited by the underlying sampling resolution of the acquired image (e.g., the pixels). That is, there is no way for the sub-sampled scan signal to recover any additional finer detail other than that included in each pixel. As described in U.S. patent application Ser. No. 13/336,275, this limitation is often at its worse when the 1D scan is a line segment that is oriented with the pixel grid (e.g., perfectly horizontal or vertical to the pixel grid of the acquired image). In contrast, the best possible scan sampling pitch may be equal to the underlying image sampling pitch. This limitation can therefore improve with a greater off-axis scan line angle. In some embodiments, the best possible scan sampling pitch of $(1/\sqrt{2})$ times the image sampling pitch can be achieved when the scan is a line segment that is oriented at 45 degrees to the pixel grid, thereby reflecting the greater information often found when barcodes are oriented diagonally. Therefore a general disadvantage of this resolution limitation can often be offset by the ability to cover and analyze a much larger area than would be possible with a laser scanner. Such a resolution limitation nevertheless often needs to be addressed.

Both image-based readers and laser scanners often need to contend with problems when a sharp signal (e.g., one that is not blurry) cannot be acquired. Both image-based readers and laser scanners often have limited depth-of-field, which is essentially the distance range from the reader over which the acquired image or laser scan signal will be in focus. In addition to depth-of-field limitations, image-based readers can be blurry. Blur refers to the amount by which a 1D scan signal is smeared due to lack of focus or other effects. For example, a 1D scan signal may be blurry due to the process by which it is extracted from a low-resolution image. As another example, blur can be caused by motion depending on the speed of the objects on which the barcodes are affixed, relative to the exposure time necessary to obtain images with reasonable contrast under the available lighting conditions.

Regardless of reader type or scan signal extraction method, a typical way to decode a barcode is to detect and measure the 1D positions of all of the element edges (also referred to as boundaries) along one or more of these scan signals. The position of each detected edge along a scan is a product of their fractional position within the scan signal and the scan sampling pitch. Such edges can be used to directly deduce the widths of the barcode elements, which can then be further classified into their discrete element sizes (e.g. narrow, wide, 1×, 2×, etc., depending on the type of symbology being used). More typically for multiple-width symbologies, however, the successive distances between neighboring edges of the same polarity (light-to-dark or dark-to light-transitions) are computed and classified (e.g., into 1×, 2×, etc.), and then used to deduce the character from its "edge-to-similar-edge" pattern, as known in the art. This indirect computation can be made in order to avoid misclassifications, or misreads) due to pronounced print growth, which is the amount by which bars appear wider and spaces narrower due to the printing process, or vice versa, typically due to ink spread. For two-width symbologies, print growth can be avoided by classifying bars and spaces separately.

Element edges can be detected using a number of different techniques known in the art, including for example discrete methods for locating the positions of maximum first derivative, or zero crossings in the second derivative, and/or waveshaping techniques for locating the boundaries of resolved elements.

However, detecting edges can be complicated by image acquisition noise and printing defects. Image acquisition noise and/or printing defects can cause false edges to be detected, as well as causing issues with low contrast (e.g. due to poor lighting, laser intensity, etc.) or blur (e.g., due to motion or poor focus), which cause certain edges not to be detected at all. Various methods for pre-filtering (e.g. smoothing) or enhancing (e.g., debluring, or sharpening) the signal, filtering out false edges or peaks and valleys, and so on, have been devised in an attempt to increase measurement sensitivity to true edges. However, even employing such methods, as the signal resolution drops, the need for greater measurement sensitivity becomes more difficult to balance against the increasing problem of differentiating false edges from real ones, as does measuring the locations of such edges with the required accuracy.

Adding the ability to combine or integrate decoded character or edge information between multiple scans across the same barcode can help (e.g., when there is localized damage to the barcode). However, even with such integration, image-based decoders that use edge-based techniques often tend to start failing between 1.3 and 1.5 pixels per module (PPM) for the scan line, depending on image quality, focus, and the orientation of the barcode relative to the pixel grid.

Essentially, as the effective resolution of the scan signal decreases, both with scan sampling resolution and blur, it becomes harder to resolve individual elements of the barcode. Narrow elements are particularly difficult to resolve, and at some resolution such narrow elements eventually blend into one another to the point where the transitions between them are completely unapparent. Difficulty in resolving is particularly problematic for an under-sampled signal. For example, as the transition between two elements (e.g., between a bar and a space) moves towards the center of a scan sample (e.g., exactly ½ sample out-of-phase), the scan sample effectively results in a sample value being the average reflectance of both elements rather than a measure of the reflectance of the high or low reflectance of the individual bars and spaces. As an exemplary problematic case, the resolution is nearly 1 sample per module, and multiple narrow elements lined up with successive samples with a half phase shift, such that the scan signal has a uniform reflectance value, with no apparent edges whatsoever.

In addition to the problems of detecting edges and differentiating from noise, the accuracy with which the scan positions of such transitions can be measured can also decrease with both sampling resolution (e.g., due to the fact that each edge transition has fewer samples over which to interpolate the place where the transition occurs) and/or blur (e.g., because the gradual transition along a blurry edge becomes more difficult to measure in the presence of noise).

This can result in telling the difference between, for example, a narrow and wide bar becomes impossible from the edges. Techniques have been devised to attempt to handle the inaccuracy due to blur, such as by concentrating on using the locations of edge pairs to locate the centers of each element, which are more stable at least to the effects of blurring, and using the relative positions between these center locations, rather than the distances between the edges, to decode the symbol. However, the centers of measured element edge boundaries are typically only more stable when the apparent edge locations have errors in opposite directions. For example, apparent edge locations may have errors in opposite directions for blurred elements having sufficient resolution (e.g., say, greater than 1.5 PPM), but not necessarily when the signal is under-sampled, where edge errors due to quantization effects are often more predominantly a function of the local phase (relative position) of the scan sampling grid relative to the pixel grid and element boundaries.

In an effort to reduce the resolution limitations, several methods have been devised to attempt to deduce the positions of missing narrow elements after determining the centers and widths of the wide elements. These methods can use constraints on the number of narrow elements between the wide elements, which are different but general for two-width and multiple-width barcodes. Methods have also been devised to attempt to recognize characters from edges, but allow for undetected edges. For example, probabilistic techniques can be employed to decode characters by matching edge-based (geometric) deformable templates. However, such methods are typically devised for blurred barcodes with sufficient sampling resolution, not for under-sampled barcodes. In fact, such techniques may specify that the standard edge-based decoding techniques should be used when the signal is deemed to be in focus. Locating and measuring the widths of even the wide elements, which continue to rely on determining the edges (boundaries), becomes difficult as the SPM decreases, such as below 1.1 samples per module. Furthermore, some of the algorithms cannot be implemented efficiently enough for practical use on industrial readers.

Further compounding these problems are trends towards adopting image-based readers in place of laser scanners (e.g., due to their wide coverage benefits), and towards reducing the cost of image-based reader systems by keeping sizes small and minimizing the number of readers. For example, this is the case in logistics applications, wherein barcodes must be read that are affixed to often randomly oriented boxes or totes on wide conveyor belts. Minimizing the number of readers requires maximizing the amount of volume (e.g., area and depth) that each reader must cover, which in turn reduces both the relative image resolution (PPM) and increases blur (due to depth-of-field limitations), both of which decrease effective image sampling resolution.

There is a need to improve the under-resolved decoding capabilities of barcode readers beyond simply blurred barcodes (e.g., particularly for image-based readers). Additionally, due to the difficulty with edge-based methods at low resolutions (e.g., below 1.1 PPM), there is a need for methods that can decode barcodes by directly analyzing the scan signal values. A technique that attempted to overcome these limitations is to use pattern matching techniques. Some pattern matching techniques attempt to decode a barcode by modeling each character in a barcode as a 1D deformable template. The 1D deformable template is allowed to scale in the horizontal dimension (e.g., to account for an unknown module size), translate in the horizontal direction (e.g., to account for an to an uncertain position along the scan line), stretch in the vertical direction (e.g., to account for unknown contrast), and translate in the vertical direction (e.g., to account for unknown background lighting intensity). However, such pattern matching techniques cannot account for the quantization effects of dramatically under-sampling the barcode, say at 1.0 PPM or below. For example, under-sampling can causes patterns to morph unrecognizably relative to the template.

Barcodes can be considered as being composed of a sequence of barcode units, with each unit having an associated width and binary encoding value. For example, for two-width barcodes, the barcode unit can have one of two widths: narrow, 'X', or wide, 'W.' As another example, for a multiple-width barcode, the barcode unit can have a width that is some multiple, n, of X. The binary encoding value can indicate whether the barcode unit is part of a bar or space. For example, B can be used to indicate the barcode unit is for bar, and S for a space. In some embodiments, numeric values can be used, e.g. B=0 and S=1, or B=−1 and S=1. Therefore each element width pattern can be associated with a unit width pattern and a unit encoding pattern.

In some examples, the barcode units can be elements, in which case a unit width pattern is the element width pattern, and the associated unit encoding pattern is an alternating pattern of bar and space values (e.g., BSBSBSBSB) with the appropriate starting value of either a bar or a space (e.g., since the elements always alternate between bars and spaces, except over an inter-character gap).

In some examples, each barcode unit is chosen to make the unit width pattern uniform. For two-width barcodes, for example, the barcode units may not be made smaller than an element, since a wide element cannot in general be further reduced to an integer number of narrow elements. For multiple-width barcodes, for example, a unit can be as small as a module, since each element width is be denoted by an integer number of module widths. Using module units can result in a uniform unit width pattern of narrow widths. In some embodiments, a particular multiple-width unit width pattern consists of some sequence of uniform modules, and the associated unit encoding pattern consists of bar and space values that together represent the encoded data for that sequence. For example, is the unit width pattern for all unit width patterns of length eleven modules, but the unit encoding pattern will vary for each element width pattern. For example, BSBSSSBBSSS is the unique unit encoding pattern for the 11× element width pattern 111323.

In some embodiments, for two-width symbologies the information in the element width pattern is directly encoded by the unit width pattern, with the unit encoding pattern alternating. For example, as described previously the unit encoding pattern is an alternating pattern of bar and space values (e.g., BSBSBSBSB). In some embodiments, for multiple-width symbologies the information in the element width pattern is indirectly encoded by the unit encoding pattern, with the unit width pattern being composed of uniform minimum features. For example, is the unit width pattern for all unit width patterns of length eleven modules, so it indirectly encodes the element width pattern because without more information the element width pattern cannot be deduced. But the unit width pattern (e.g., BSBSSSBBSSS for the 11× element width pattern 111323) will include eleven features (e.g., eleven Bs and Ss).

Advantageously, analyzing a two-width symbology or a multiple-width symbology using element units, each unique data character in the symbology can be associated with a unique unit (e.g., element) sequence. The unit encoding pattern can be an alternating binary pattern that is the same size for all characters. Analyzing a multiple-width symbology using module units, each unique data character in the symbology can be associated with a unique unit (e.g., module) pattern, and the unit (e.g., module) sequence can be the same for all characters.

For example, when using module units for the two-width symbology Code39 the unique unit width pattern for an 'A' is its element width pattern WXXXXWXXW, and the unique unit width pattern for a 'B' is its element width pattern XXWXXWXXW. But all Code39 data characters are associated with the same length nine binary unit encoding pattern, BSBSBSBSB. Similarly for Code128, when using element units, the unique unit width pattern for an 'A' is its element width pattern 111323, and the unit width pattern for 'B' is its element width pattern 131123. But all Code128 characters are associated with the same length six binary unit encoding pattern, BSBSBS.

As another example, when using module units for the multiple-width symbology Code128, the unit width pattern for all characters is the same length eleven uniform sequence, but the unique unit encoding pattern for an 'A' is BSBSSSBBSSS (e.g., corresponding to the element width pattern 111323), and the unique unit encoding pattern for a 'B' is BSSSBWBBSSS (e.g., corresponding to the element width pattern 131123).

By representing barcodes and barcode characters as being composed as units, sampling quantization effects can be modeled mathematically. For example, the model can be generated based on:
(1) (a) a contiguous sequence of barcode elements (e.g., without any inter-character gap), and (b) associated quantized widths for each of the barcode elements, expressed as an element width pattern;
(2) the starting position of the first element of the barcode element sequence, in sample coordinates (e.g., in fractional numbers of sample pitches, with the fractional part essentially being the beginning "phase" relative to the sampling grid); and
(3) the minimum feature size (X) and wide element width (W), if applicable (or, equivalently, the wide-to-narrow ratio), measured in fractional numbers of samples.

Using such information, the relationship between those barcode elements and the raw signal can be expressed using a single matrix equation, $$A*b=s \qquad \text{Equation 1}$$

Where:
A is a unit sampling coefficients matrix, a sparse matrix of sampling coefficients, that depends on a unit grid, defining the positions of unit boundaries along the scan, comprised of:
The unit sub-sequence that spans the barcode element sequence;
The minimum feature size, X;
The wide element size, W (if applicable);
The starting position of the first barcode element in the sequence;
b is the binary unit encoding pattern of bar and space values; and
s is the vector representing normalized scan samples.

Each row of the sampling coefficients matrix A can correspond to a sample, and each column can correspond to a unit (e.g., module for multiple-width barcodes, or element for two-width barcodes). The values in each row can be selected to add to 1.0, and the values of each column can be selected add to the respective unit (e.g., module or element) width (e.g., X or W).

The $i^{th}$ normalized sample for the vector s, s(i), can be given by the following equation:

$$s(i)=B+[(r(i)-l(i))\times(S-B)]/(h(i)-l(i)) \quad \text{Equation 2}$$

Where:
  r is the vector representing a contiguous portion of the scan signal over the sample bins; and
  h and l are vectors of values representing the discrete approximation to the signal envelope of r, such that:
    h(i) is the estimate for the reflectance of a space at sample i; and
    l(i) is the estimate for the reflectance of a bar at sample i.

The vector r can be assumed to cover the range of positions for the entire unit sub-sequence. In some embodiments, the values of r can be the measured reflectance values. Each row i of A can be a vector of the respective proportions of the barcode units in the unit width pattern that are integrated by the bin for sample i to get a measure of the reflectance for that scan sample. In some embodiments the unit coefficients depend on the unit grid, which can represent the positions of the transitions between the units. The unit grid may be affected by the phase (e.g., starting point), minimum feature size, print growth, wide-to-narrow ratio (if any), and/or the like.

Figure 4:
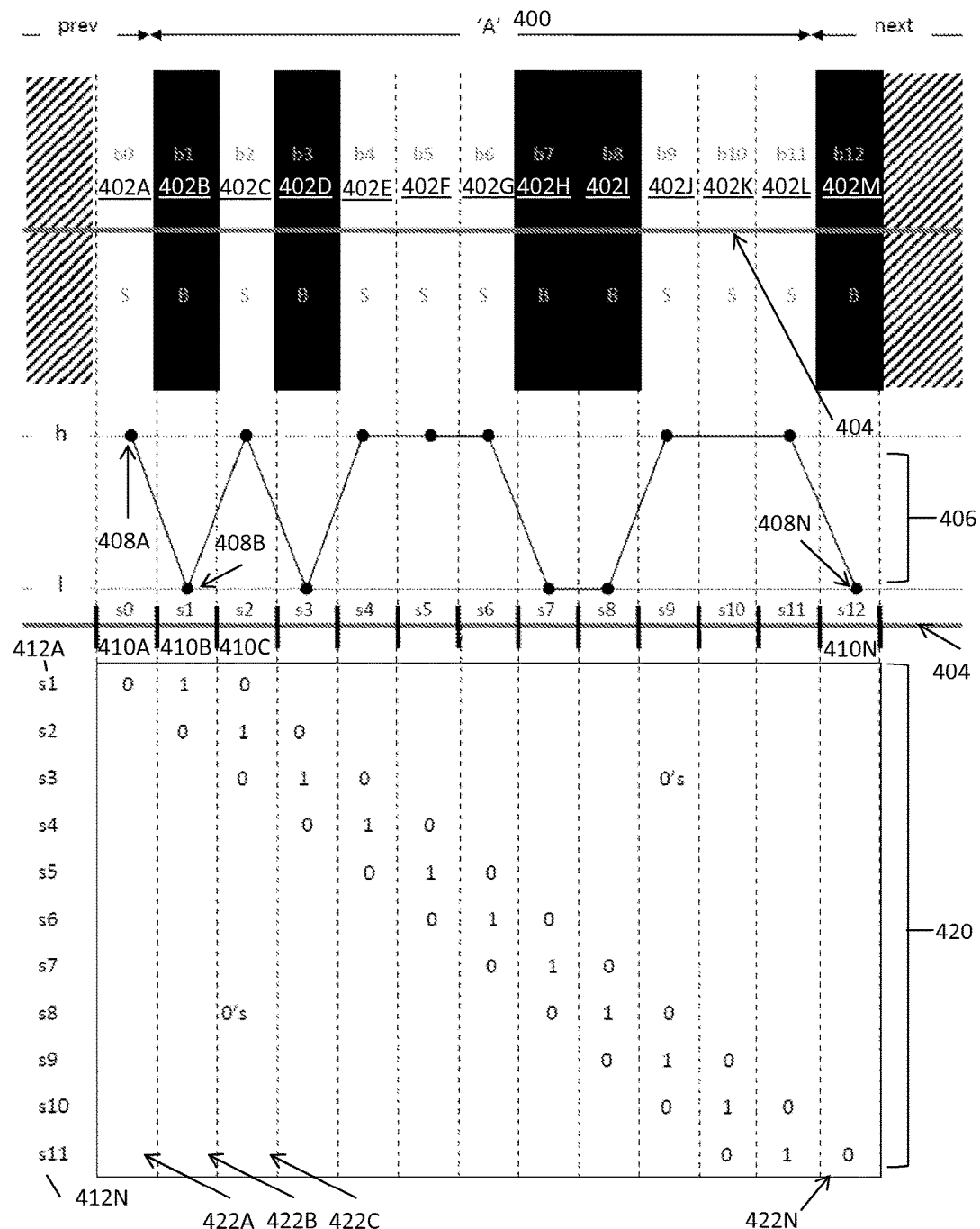
FIG. 4 illustrates an exemplary scanline subsampling and sampling coefficients for a multi-width barcode at 1 SPM and 0 phase for decoding barcodes, in accordance with some embodiments.

FIG. 4 illustrates an exemplary scanline subsampling and sampling coefficients for a multi-width barcode at 1 sample per module ("SPM") and 0 phase for decoding barcodes, in accordance with some embodiments. FIG. 4 shows the A data character modules 400, which consists of barcode modules b1 402B, b2 402C, b3 402D, b4 402E, b5 402F, b6 402G, b7 402H, b8 402I, b9 402J, b10 402K, and b11 402L. The character units 402 include these modules as well as the last module of the previous character b0 402A (a space), and the first module of the previous character b12 402M (a bar).

FIG. 4 shows the scan signal 406 derived from the scan 404. The scan signal 406 includes scan samples 408A, 408B through 408N, collectively referred to herein as scan samples 408. The scan samples 408 represent samples for a corresponding scan sample bins s0 410A, s1 410B through s12 410N, collectively referred to as scan sample bins 410. For example, scan sample 408A represents the scan sample for scan sample bin s0 410A. Because each scan sample bin 410 is aligned with the start of the character units 402, the scan sample bins 410 have zero (0) phase relative to the character units 402. FIG. 4 also shows the unit sampling coefficients matrix 420. Each row of the unit sampling coefficients matrix 420 s1 412A through s11 412N (collectively referred to herein as rows 412) corresponds to a sample, and is a vector of the sampling coefficients for character units in the unit width pattern. Each column 422A through 422N (collectively, columns 422) of the unit sampling coefficients matrix 420 corresponds to a unit (e.g., module). As shown in FIG. 4, the width of each scan sample bin 410 corresponds to the width of a module of the barcode character 400, because the sampling pitch is exactly the module width. The unit sampling coefficients matrix 420 includes zeros at all locations besides those shown including a one (not all zeros are shown for simplicity). Row s1 412A includes a one at column two 422B because scan sample bin s1 410B coincides with the entire module b1 402B, row s2 412B includes a one at column three 422C because scan sample bin s2 410B coincides with the entire module b2 402C, and so on.

Figure 5:
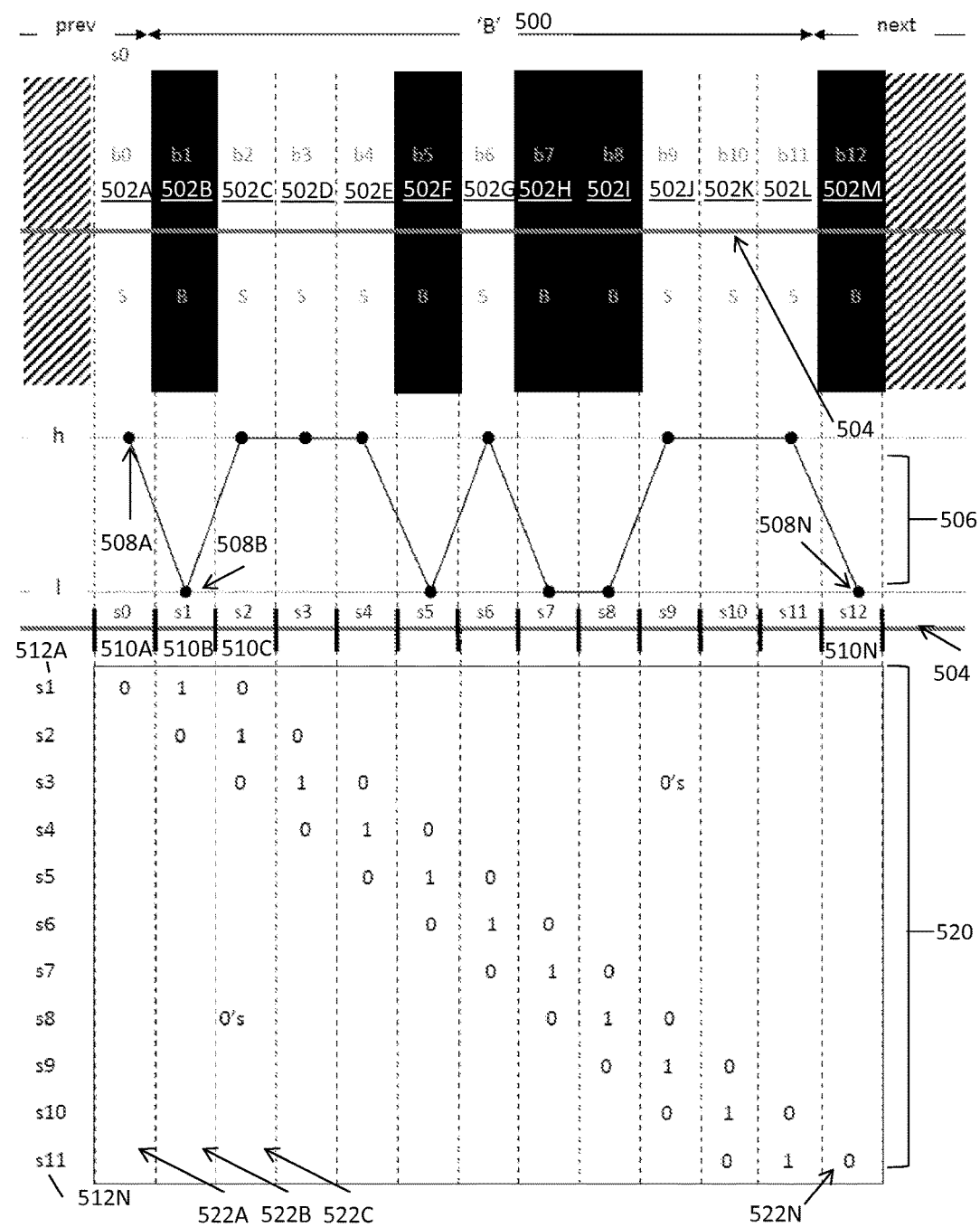
FIG. 5 illustrates an exemplary scanline subsampling and sampling coefficients for a multi-width barcode at 1 SPM and 0 phase for decoding barcodes, in accordance with some embodiments.

FIG. 5 illustrates an exemplary scanline subsampling and sampling coefficients for a multi-width barcode at 1 SPM and 0 phase for decoding barcodes, in accordance with some embodiments. FIG. 5 shows the B data character element sequence 500, which consists of barcode modules b1 502B, b2 502C, b3 502D, b4 502E, b5 502F, b6 502G, b7 502H, b8 502I, b9 502J, b10 502K, and b11 502L. The character units 502 include these modules as well as the last module of the previous character b0 502A (a space), and the first module of the previous character b12 502M (a bar).

FIG. 5 shows the scan signal 506 derived from the scan 504. The scan signal 506 includes scan samples 508A, 508B through 508N, collectively referred to herein as scan samples 508. The scan samples 508 represent samples for a corresponding scan sample bin s0 510A, s1 510B through s12 510N. For example, scan sample 508A represents the scan sample for scan sample bin s0 510A. FIG. 5 also shows the unit sampling coefficients matrix 520. Because each scan sample 510 is aligned with the start of the barcode modules 502, the units 502 have zero (0) phase relative to the scan sample bins 510. Each row of the unit sampling coefficients matrix 520 s1 512A through s11 512N (collectively referred to herein as rows 512) corresponds to a sample, and is a vector of sampling coefficients for the barcode units in the unit width pattern. Each column 522A through 522N of the unit sampling coefficients matrix 520 corresponds to a unit (e.g., module). Like in FIG. 4, the width of each scan sample bin 510 corresponds to the width of a module of the barcode 500. The unit sampling coefficients matrix 520 includes zeros at all locations besides those shown including a one (not all zeros are shown for simplicity). Row s1 512A includes a one in the second column 522B because scan sample bin s1 510B coincides with the entire module for bar b1 502B, row s2 512B includes a one at the third column 522C because scan sample bin s2 510B coincides with the entire module for bar b2 502C, and so on. Note that the resulting unit sampling coefficients matrix 520 is the same as unit sampling coefficients matrix 420 in FIG. 4 because, like with FIG. 4, the units 502 are at zero phase relative to the scan sample bins 510, and the module size is exactly equal to the module size.

Figure 6:
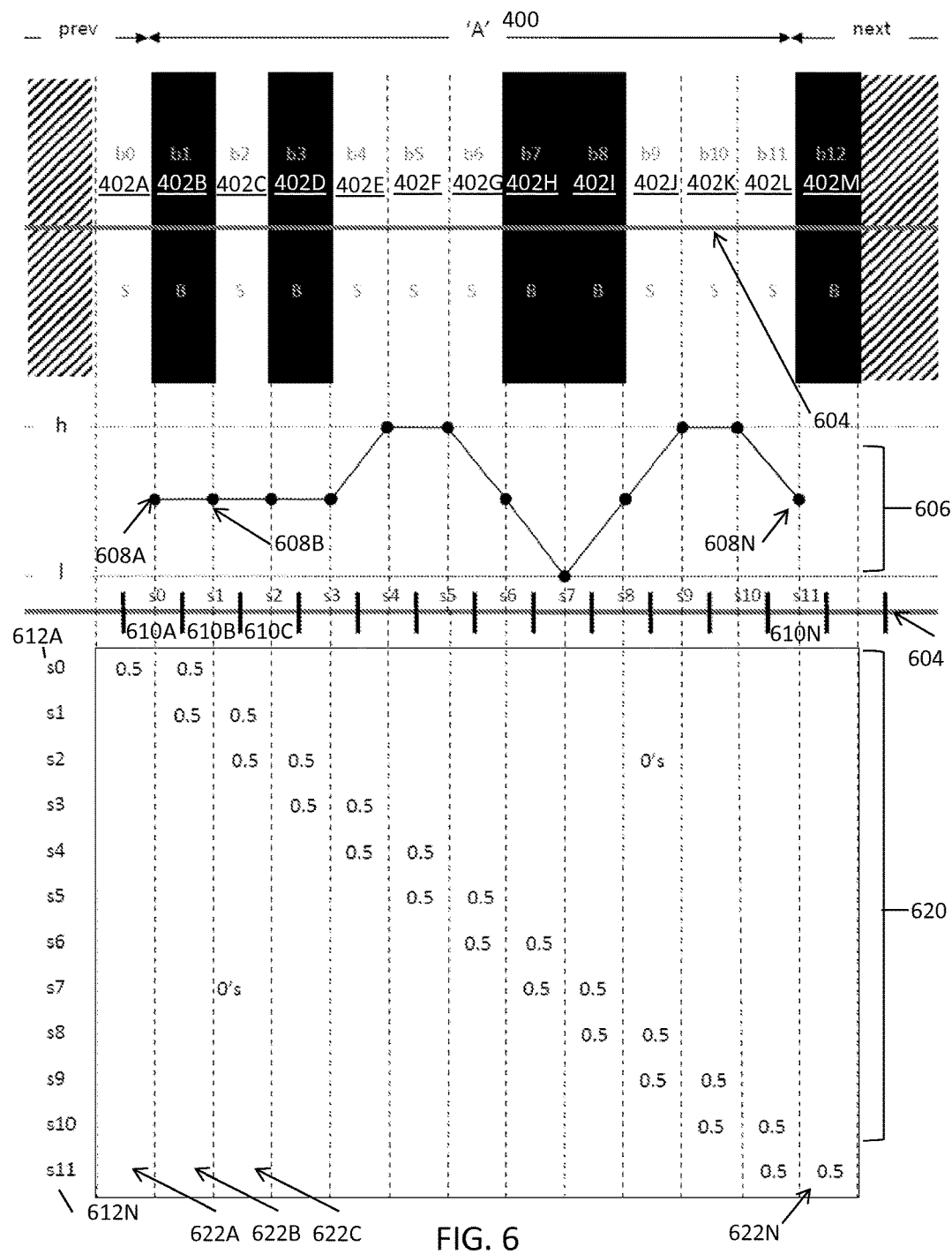
FIG. 6 illustrates an exemplary scanline subsampling and sampling coefficients for a multi-width barcode at 1 SPM and 0.5 phase for decoding barcodes, in accordance with some embodiments.

FIG. 6 illustrates an exemplary scanline subsampling and sampling coefficients for a multi-width barcode at 1 SPM and 0.5 phase for decoding barcodes, in accordance with some embodiments. FIG. 6 shows the A data character module sequence 400 from FIG. 4. FIG. 6 shows the scan signal 606 derived from the scan 604. The scan signal 606 includes scan samples 608A, 608B through 608N, collectively referred to herein as scan samples 608. The scan samples 608 represent samples for a corresponding scan sample bin s0 610A, s1 610B through s11 610N. For example, scan sample 608A represents the scan sample for scan sample bin s0 610A, which is between high and low because half its area is covered by b0 and half of its area is covered by b1. Because each unit 402 is offset with the start of each scan sample bin 610 by half of the width of a scan sampling pitch bin, and because the sampling pitch is exactly equal to the module size, the units 402 are at (0.5) phase relative to the scan sample bins 610.

FIG. 6 also shows the unit sampling coefficients matrix 620. Each row of the unit sampling coefficients matrix 620 s0 612A through s11 612N (collectively referred to herein as rows 612) corresponds to a sample, and is a vector of sampling coefficients for the barcode units in the unit width pattern. Each column 622A through 622N (collectively, columns 622) of the unit sampling coefficients matrix 620 corresponds to a unit (e.g., module). While the width of each scan sample bin 610 is equal to the width of each barcode module, each scan sample bin 610 is half covered by each of two consecutive barcode elements 402. The unit sampling coefficients matrix 620 includes zeros at all locations besides those shown including one half (½) (not all zeros are shown for simplicity). Row s0 612A includes a 0.5 at column one 622A because scan sample bin s0 610A is half covered by bar b0 402A, and includes a 0.5 at column two 622B because scan sample bin s0 610A contains is half covered by bar b1 402B. Row s1 612B includes a 0.5 at column two 622B because scan sample bin s1 610B is half covered by bar b1 402B, and includes a 0.5 at column three 622C because scan sample bin s1 610B is half covered by bar b2 402C.

Figure 7:
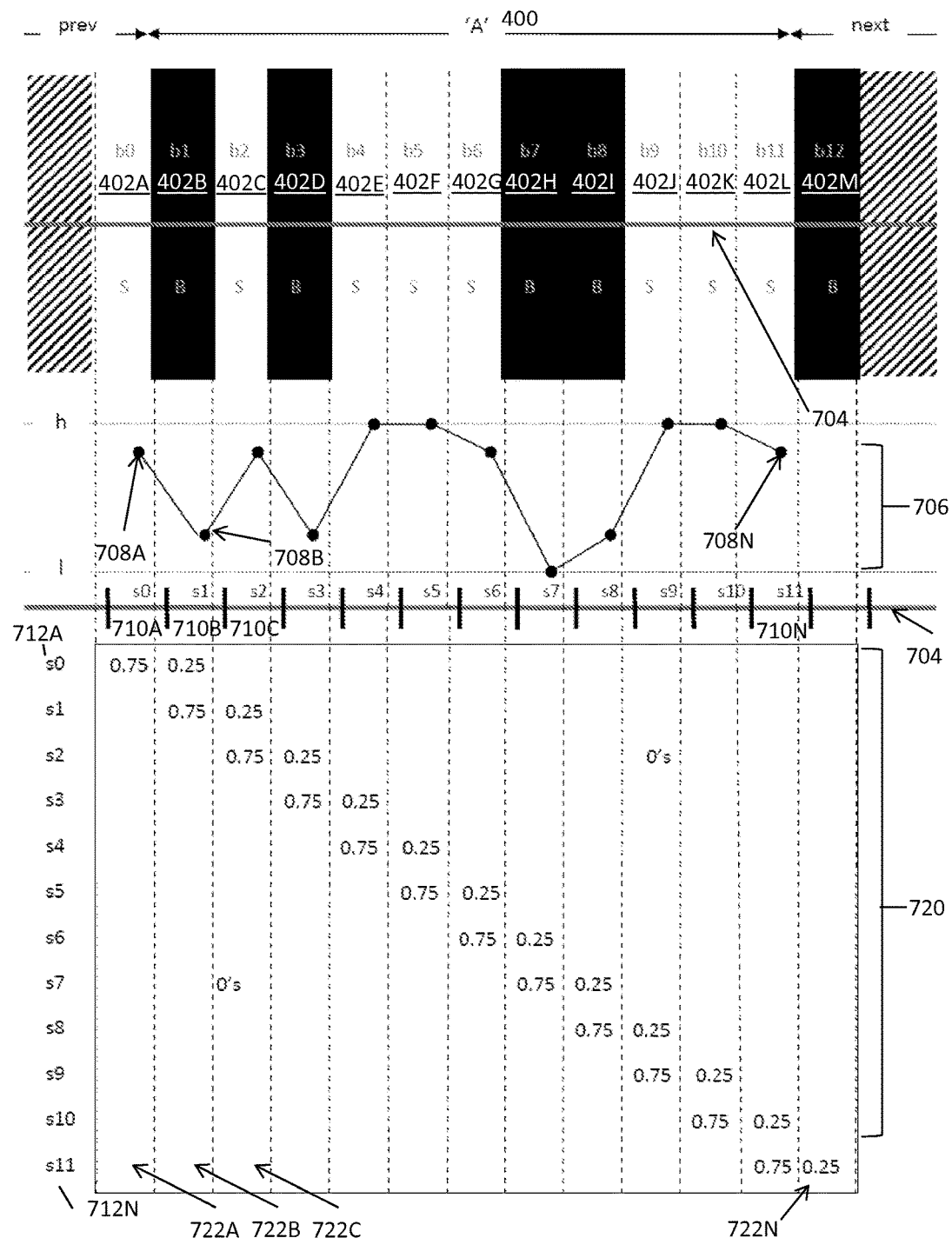
FIG. 7 illustrates an exemplary scanline subsampling and sampling coefficients for a multi-width barcode at 1 SPM and −0.25 phase for decoding barcodes, in accordance with some embodiments.

FIG. 7 illustrates an exemplary scanline subsampling and sampling coefficients for a multi-width barcode at 1 SPM and −0.25 phase for decoding barcodes, in accordance with some embodiments. FIG. 7 shows the A data character element sequence 400 from FIG. 4. FIG. 7 shows the scan signal 706 derived from the scan 704. The scan signal 706 includes scan samples 708A, 708B through 708N, collectively referred to herein as scan samples 708. The scan samples 708 represent samples for a corresponding scan sample bin s0 710A, s1 710B through s11 710N. For example, scan sample 708A represents the scan sample for scan sample bin s0 710A, which is three-quarters of the way towards high from low because scan sample bin s0 is covered 0.75% by module b0 having a reflectance of h and 0.25% by module b1 having a reflectance of 1. Because each unit 402 is offset backwards from the start of each scan sampling bin 410 by one quarter of the width of a module, the units 402 are at (−0.25) phase relative to the scan sample bins 710.

FIG. 7 also shows the unit sampling coefficients matrix 720. Each row of the unit sampling coefficients matrix 720 s0 712A through s11 712N (collectively referred to herein as rows 712) corresponds to a sample, and is a vector of the sampling coefficients for the barcode units in the unit width pattern. Each column 722A through 722N (collectively, columns 722) of the unit sampling coefficients matrix 720 corresponds to a unit (e.g., module). While the width of each scan sample bin 710 is equal to the width of each barcode module, each scan sample bin 710 is 0.75% covered and 0.25% covered by two consecutive barcode units 402, respectively, due to the −0.25 phase. The unit sampling coefficients matrix 720 includes zeros at all locations besides those shown including non-zero values (not all zeros are shown for simplicity). Row s0 712A includes a 0.75 in the first column 722A because scan sample bin s0 710A is covered ¾ by module b0 402A, and includes a 0.25 in the second column 722B because scan sample bin s0 710A is covered ¼ by module b1 402B. Row s1 712B includes a 0.75 in the second column 722B because scan sample bin s1 710B is covered ¾ by module b1 402B, and includes a 0.25 in the third column 722C because scan sample bin s1 710B is covered ¼ by module b2 402C.

Figure 8:
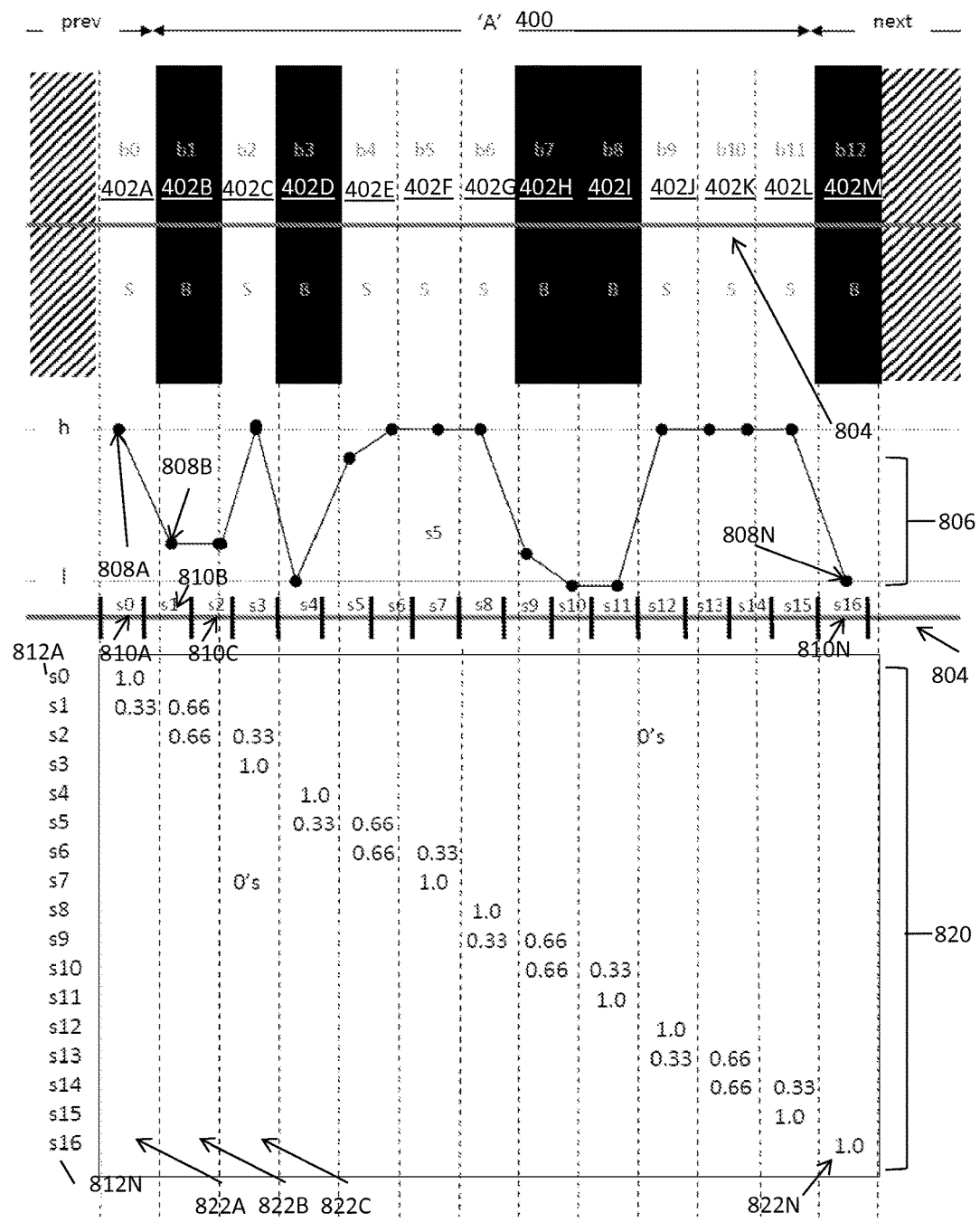
FIG. 8 illustrates an exemplary scanline subsampling and sampling coefficients percentages for a multi-width barcode at 1.33 SPM and 0.33 phase for decoding barcodes, in accordance with some embodiments.

FIG. 8 illustrates an exemplary scanline subsampling and sampling coefficients for a multi-width barcode at 1.33 SPM and ⅓ phase for decoding barcodes, in accordance with some embodiments. FIG. 8 shows the A data character module sequence 400 from FIG. 4. FIG. 8 shows the scan signal 806 derived from the scan 804. The scan signal 806 includes scan samples 808A, 808B through 808N, collectively referred to herein as scan samples 808. The scan samples 808 represent samples for a corresponding scan sample bin s0 810A, s1 810B through s16 810N. For example, scan sample 808A represents the scan sample for scan sample bin s0 810A, which is a high value because scan sample bin s0 is covered entirely by b0. As another example, scan sample 808B represents the scan sample for scan sample bin s1 810B, which is ⅔ of the way to low from high because scan sample bin s1 is covered ⅓ by the reflectance of b0 and ⅔ by the reflectance of b1. Because unit 402B (the beginning of the character modules) starts to the right of s1 810B, the units 402 are at one third (⅓) phase relative to the scan sample bins 810.

FIG. 8 also shows the unit sampling coefficients matrix 820. Each row of the unit sampling coefficients matrix 820 s0 812A through s16 812N (collectively referred to herein as rows 812) corresponds to a scan sample, and is a vector of the sampling coefficients of barcode units in the unit width pattern. Each column 822A through 822N (collectively, columns 822) of the unit sampling coefficients matrix 820 corresponds to a unit (e.g., module). The width of each scan sample bin 810 is equal to ⅔ of a barcode module due to the 1.33 SPM. The unit sampling coefficients matrix 820 includes zeros at all locations besides those shown including non-zero values (not all zeros are shown for simplicity). For example, row s0 812A includes a 1.0 in the first column 822A because scan sample bin s0 810A is covered entirely by module b0 402A (and no portion of any other module). Row s1 812B includes a 0.33 in the first column 822A because scan sample bin s1 810B is covered ⅓ by unit b0 402A, and includes a 0.66 in the second column 822B because scan sample bin s1 810B is covered ⅔ by module b2 402C.

Figure 9:
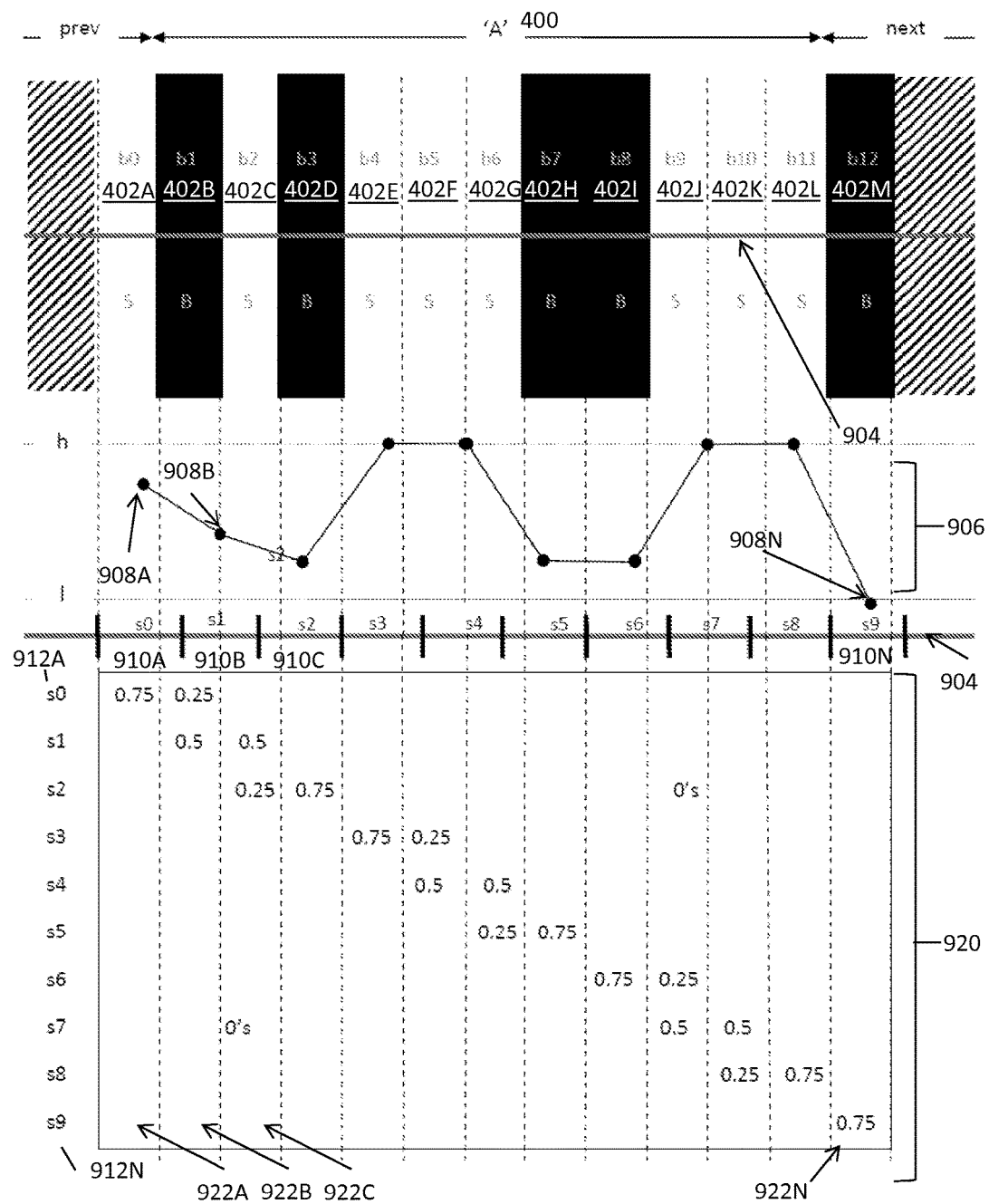
FIG. 9 illustrates an exemplary scanline subsampling and sampling coefficients for a multi-width barcode at 0.75 SPM and −0.25 phase for decoding barcodes, in accordance with some embodiments.

FIG. 9 illustrates an exemplary scanline subsampling and sampling coefficients for a multi-width barcode at 0.75 SPM and −0.25 phase for decoding barcodes, in accordance with some embodiments. FIG. 9 shows the A data character module sequence 400 from FIG. 4. FIG. 9 shows the scan signal 906 derived from the scan 904. The scan signal 906 includes scan samples 908A, 908B through 908N, collectively referred to herein as scan samples 908. The scan samples 908 represent samples for a corresponding scan sample bin s0 910A, s1 910B through s9 910N. For example, scan sample 908A represents the scan sample for scan sample bin s0 910A, which is a value representative of the 0.75 the reflectance of b0 402A and 0.25 the reflectance of b1 402B. As another example, scan sample 908B represents the scan sample for scan sample bin s1 910B, which is half the covered by module b0 and half covered by module b1. Because unit 402B (the first of the character modules) starts to the left of s1 910B by 0.25 the sampling pitch, the units 402 are at negative a quarter (−¼) phase relative to the scan sample bins 910.

FIG. 9 also shows the unit sampling coefficients matrix 920. Each row of the unit sampling coefficients matrix 920 s0 912A through s9 912N (collectively referred to herein as rows 912) corresponds to a scan sample, and is a vector of sampling coefficients of the barcode units in the unit width pattern. Each column 922A through 922N (collectively, columns 922) of the unit sampling coefficients matrix 920 corresponds to a unit (e.g., module). The width of each scan sample bin 910 is equal to 1 and ⅓ of a barcode element due to the 0.75 SPM. The unit sampling coefficients matrix 920 includes zeros at all locations besides those shown including non-zero values (not all zeros are shown for simplicity). For example, row s0 912A includes a 0.75 in the first column 922A because scan sample bin s0 910A is covered ¾ by unit b0 402A, and includes a 0.25 in the second column 922B because scan sample bin s0 910A is ¼ covered by unit b1 402B. Row s1 912B includes a 0.5 in the first column 822A because scan sample bin s1 810B is ½ covered by unit b1 402B, and includes a 0.5 in the second column 922B because scan sample unit s1 910B is ½ covered by unit b2 402C.

Figure 10:
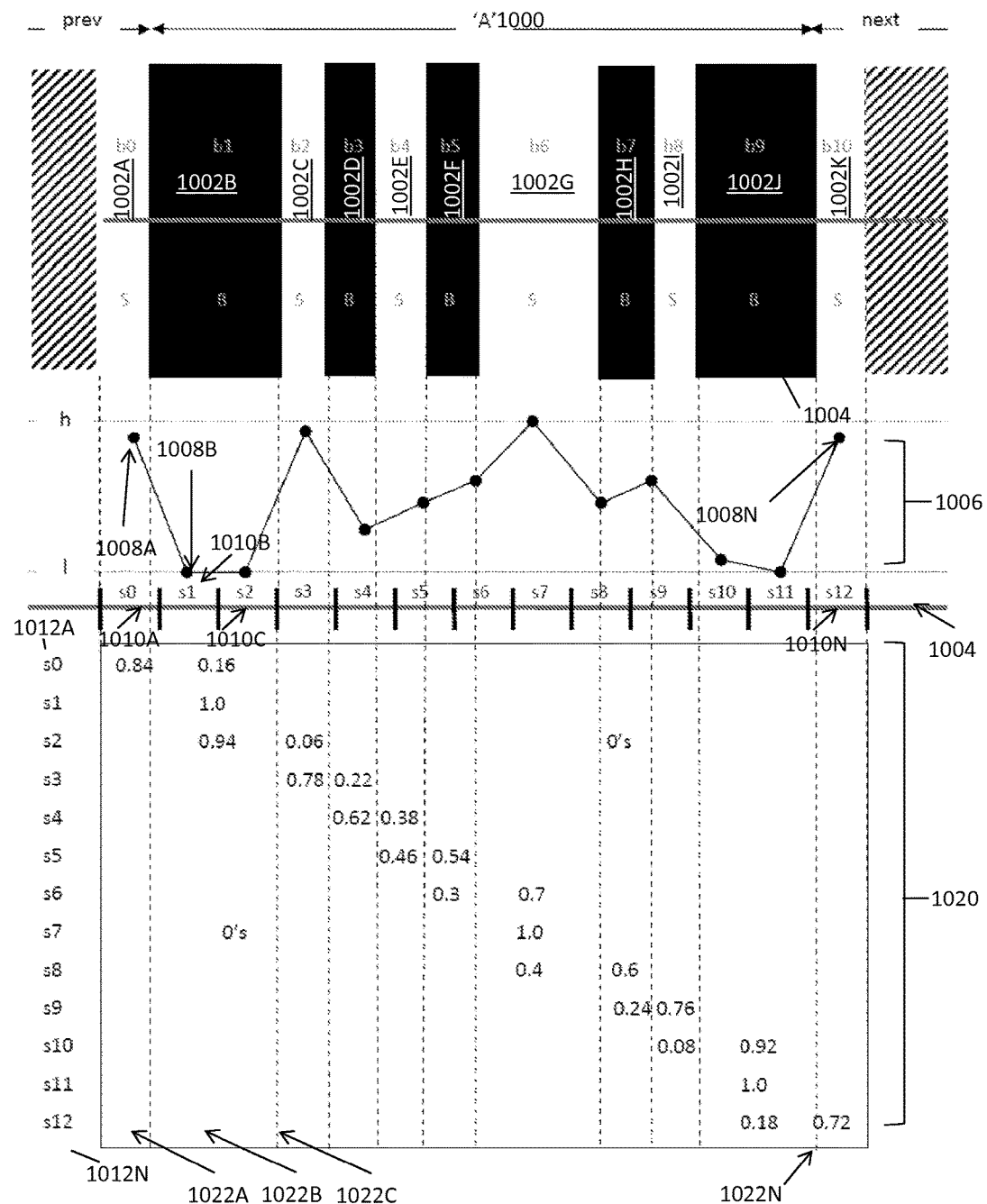
FIG. 10 illustrates an exemplary scanline subsampling and sampling coefficients for a two-width barcode at 0.84 SPM, 2.1 width (W) and −0.16 phase for decoding barcodes, in accordance with some embodiments.

FIG. 10 illustrates an exemplary scanline subsampling and sampling coefficients for a two-width barcode at 0.84

SPM, a width (W) of 2.1, and −0.16 phase for decoding barcodes, in accordance with some embodiments. FIG. 10 shows the A data character element sequence 1000, which consists of barcode elements b0 1002A, b1 1002B, b2 1002C, b3 1002D, b4 1002E, b5 1002F, b6 1002G, b7 1002H, b8 1002I, b9 1002J, and b10 1002K, collectively referred to as barcode units (elements) 1002.

FIG. 10 shows the scan signal 1006 derived from the scan 1004. The scan signal 1006 includes scan samples 1008A, 1008B through 1008N, collectively referred to herein as scan samples 1008. The scan samples 1008 represent samples for a corresponding scan sample bin s0 1010A, s1 1010B through s9 1010N. For example, scan sample 1008A represents the scan sample for scan sample bin s0 1010A, which is a value representative of 0.84 the reflectance of unit b0 1002A 0.16 the reflectance of unit b1 1002B. As another example, scan sample 1008B represents the scan sample for scan sample bin s1 1010B, which is entirely covered by unit b1 1002B. Because unit 1002B (the first element of the character) starts to the left of scan sample bin s1 1010B, the units 1002 are at −0.16 phase relative to the scan sample bins 1010.

FIG. 10 also shows the unit sampling coefficients matrix 1020. Each row of the unit sampling coefficients matrix 1020 s0 1012A through s12 1012N (collectively referred to herein as rows 1012) corresponds to a scan sample, and is a vector of the sampling coefficients for barcode units in the unit width pattern. Each column 1022A through 1022N (collectively, columns 1022) of the unit sampling coefficients matrix 1020 corresponds to a unit (e.g., element). The unit sampling coefficients matrix 1020 includes zeros at all locations besides those shown including non-zero values (not all zeros are shown for simplicity). For example, row s0 1012A includes a 0.84 in the first column 1022A because 84% of scan ample bin s0 1010A is covered by unit b0 1002A, and includes a 0.16 in the second column 1022B because 16% of scan sample bin s0 1010A is covered by unit b1 1002B. Row s1 1012B includes a 1.0 in the second column 1022B because all of scan sample bin s1 910B is covered by unit b1 1002B.

In some embodiments, multiple-width symbologies employ module units, as depicted in FIGS. 4-9. Since the unit width pattern (e.g., and therefore unit grid) can be the same for all possible element width patterns, there can be one unit sampling coefficients matrix for any particular section of the symbol over which the apparent module size remains constant (e.g., a character, several characters, or even the entire barcode). Decoding such a section of the barcode can be performed, for example, by solving a linear system of equations for the actual unit encoding pattern (e.g., module values), and then converting that to the element width pattern and ultimately to its associated alphanumeric value. In some embodiments, decoding can be done by using elements for multiple-width symbologies, described further below.

Figure 11:
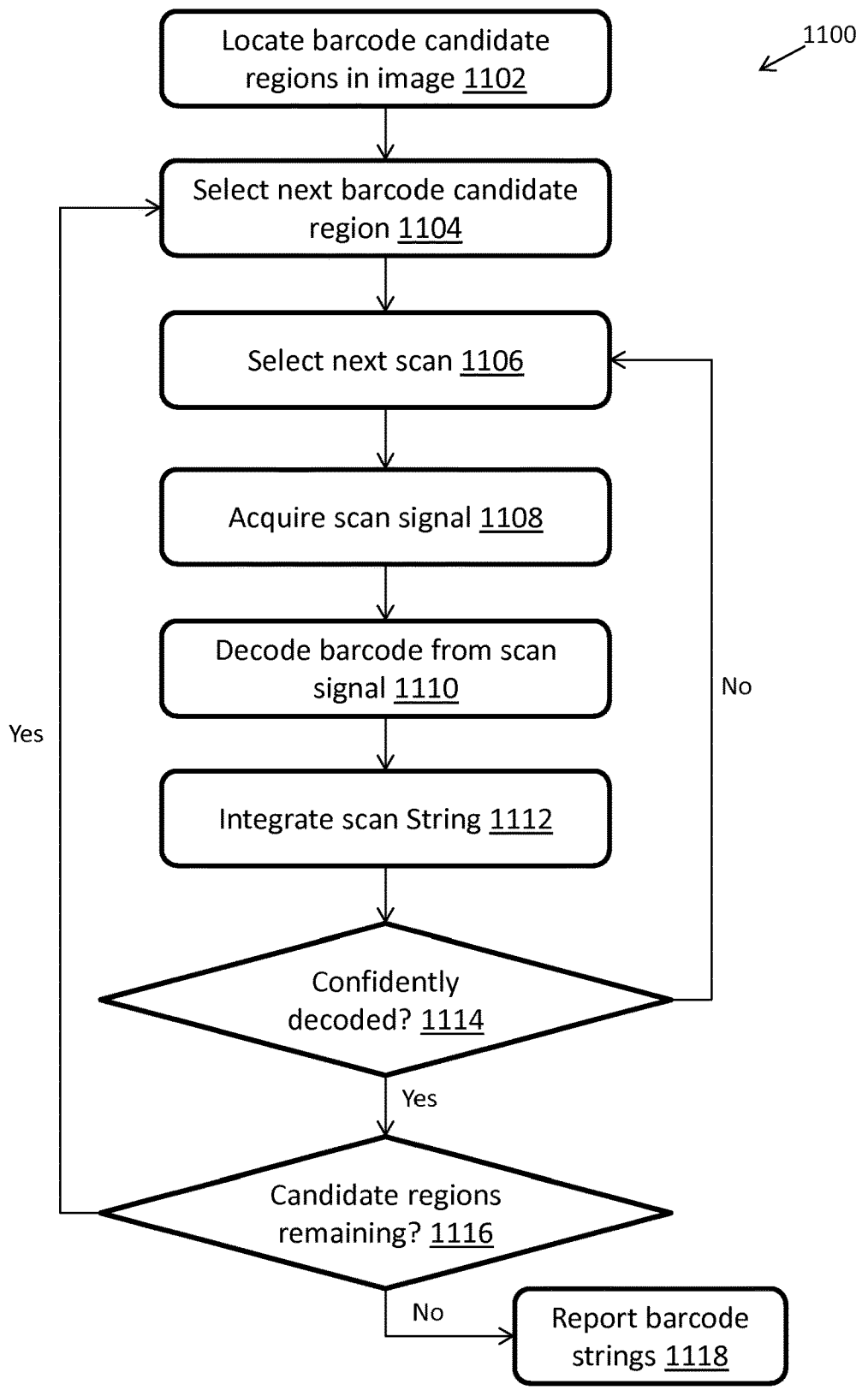
FIG. 11 illustrates an exemplary computerized method of a general image-based decoding algorithm for decoding barcodes, in accordance with some embodiments.

FIG. 11 illustrates an exemplary computerized method 1100 of a general image-based decoding algorithm for decoding barcodes, in accordance with some embodiments. At step 1102, the reader locates barcode candidate regions in an acquired image (e.g., of a barcode on an item on a conveyor belt). At step 1104, the reader selects a next barcode candidate region. For example, the next candidate region is one that has the most bar-like features within. The reader can initialize the integrated string for this candidate. At step 1106, the reader selects a next scan from a set of scans through the candidate region (e.g., scan 404 from FIG. 4). Scans can be, for example, line segments that are roughly parallel to other scans and span from one end of the barcode candidate to the other. The reader can select a scan using different orders. For example, the reader can select a next scan in order from top to bottom, from center to outside, and or the like.

At step 1108, the reader acquires a scan signal (e.g., scan signal 406), such as by using projection. At step 1110, the reader decodes the barcode from the scan signal. The decoding process is described further in conjunction with FIG. 13. At step 1112, the reader integrates the scan string. For example, the reader can combine the decoded string from the scan (including character scores) with the integrated string so far for this candidate scan. At step 1114, the barcode reader determines whether barcode is confidently decoded (e.g., based on a confidence threshold). If the reader determines that the barcode is not confidently decoded, the reader proceeds back to step 1106 and performs steps 1108 through 1112 on the next selected scan (if any remain). If additional candidate regions remain, the method 1100 proceeds back to step 1104. If complete, the method 1100 reports the barcode string. The barcode string can include non-confidently decoded barcodes, partially decoded barcodes, and/or the like.

Figure 12:
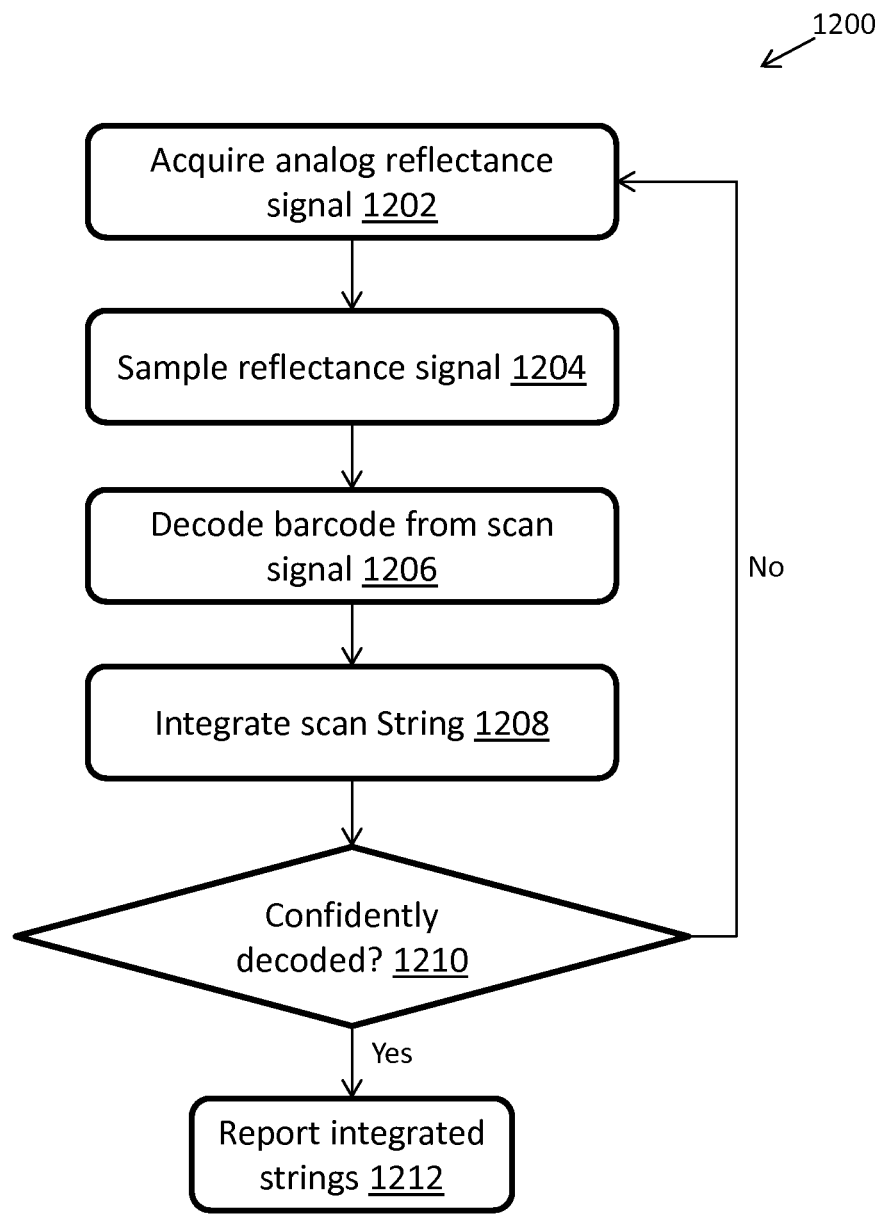
FIG. 12 illustrates an exemplary computerized method of a laser scanner decoding algorithm for decoding barcodes, in accordance with some embodiments.

FIG. 12 illustrates an exemplary computerized method 1200 of a laser scanner decoding algorithm for decoding barcodes, in accordance with some embodiments. At step 1202, the laser scanner acquires an analog reflectance signal. The analog reflectance signal is the reflectance of barcode along linear scan across the barcode, as measured by laser and detector. At step 1204, the laser scanner samples the reflectance signal (e.g., by extracting a discrete digital scan signal by temporal sampling). At step 1206, the laser scanner decodes the barcode from the scan signal. The decoding process is described further in conjunction with FIG. 13. At step 1208, the laser scanner integrates the scan string. At step 1210, the laser scanner determines whether the barcode is confidently decoded. If the laser scanner determines that the barcode is not confidently decoded, the laser scanner proceeds back to step 1202 and acquires a new analog reflectance signal. Otherwise method 1200 proceeds to step 1212 and reports the integrated strings.

Figure 13A:
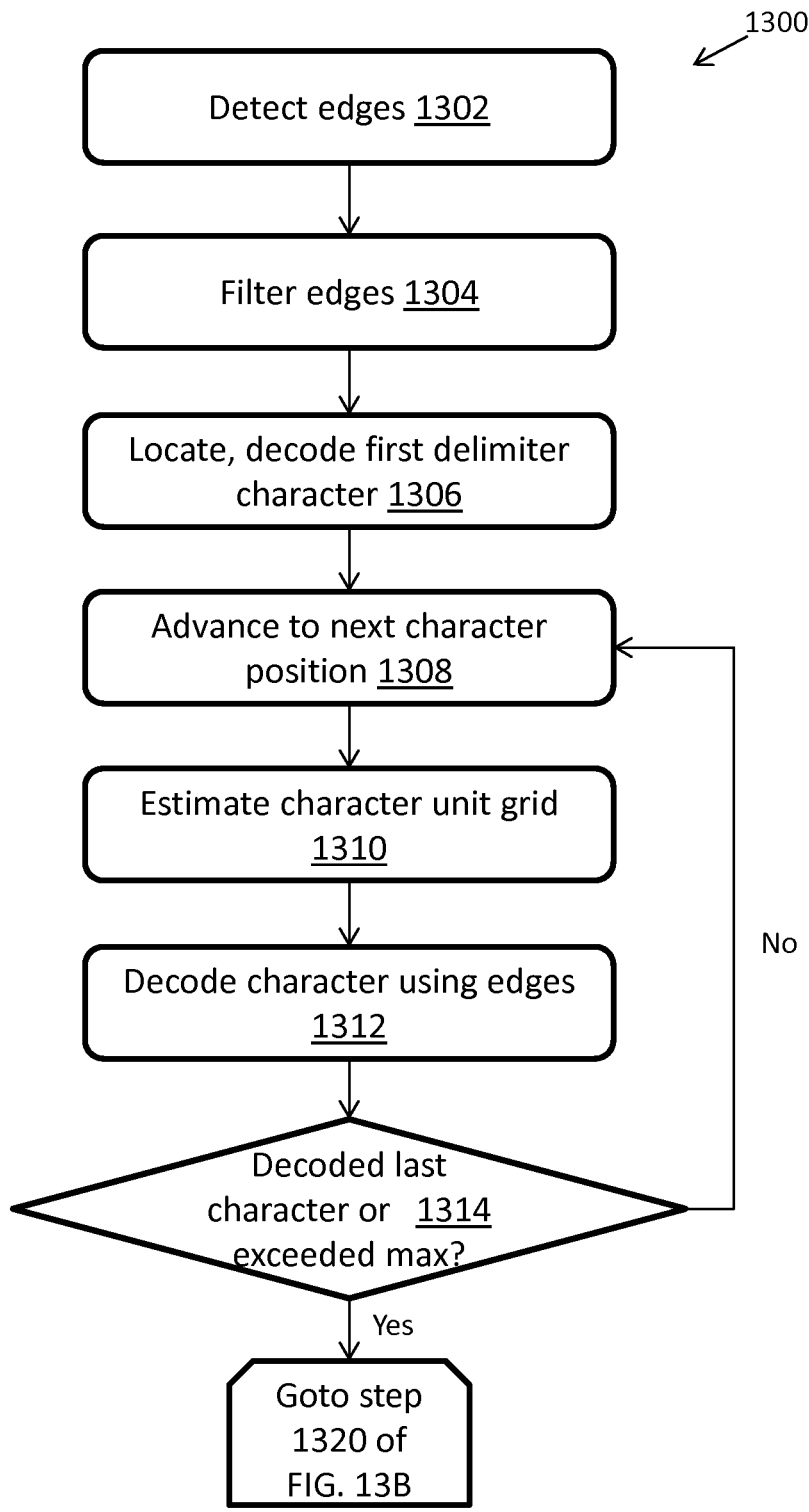
FIGS. 13A-B illustrate an exemplary computerized method for decoding a barcode from a scan signal, in accordance with some embodiments.
Figure 13B:
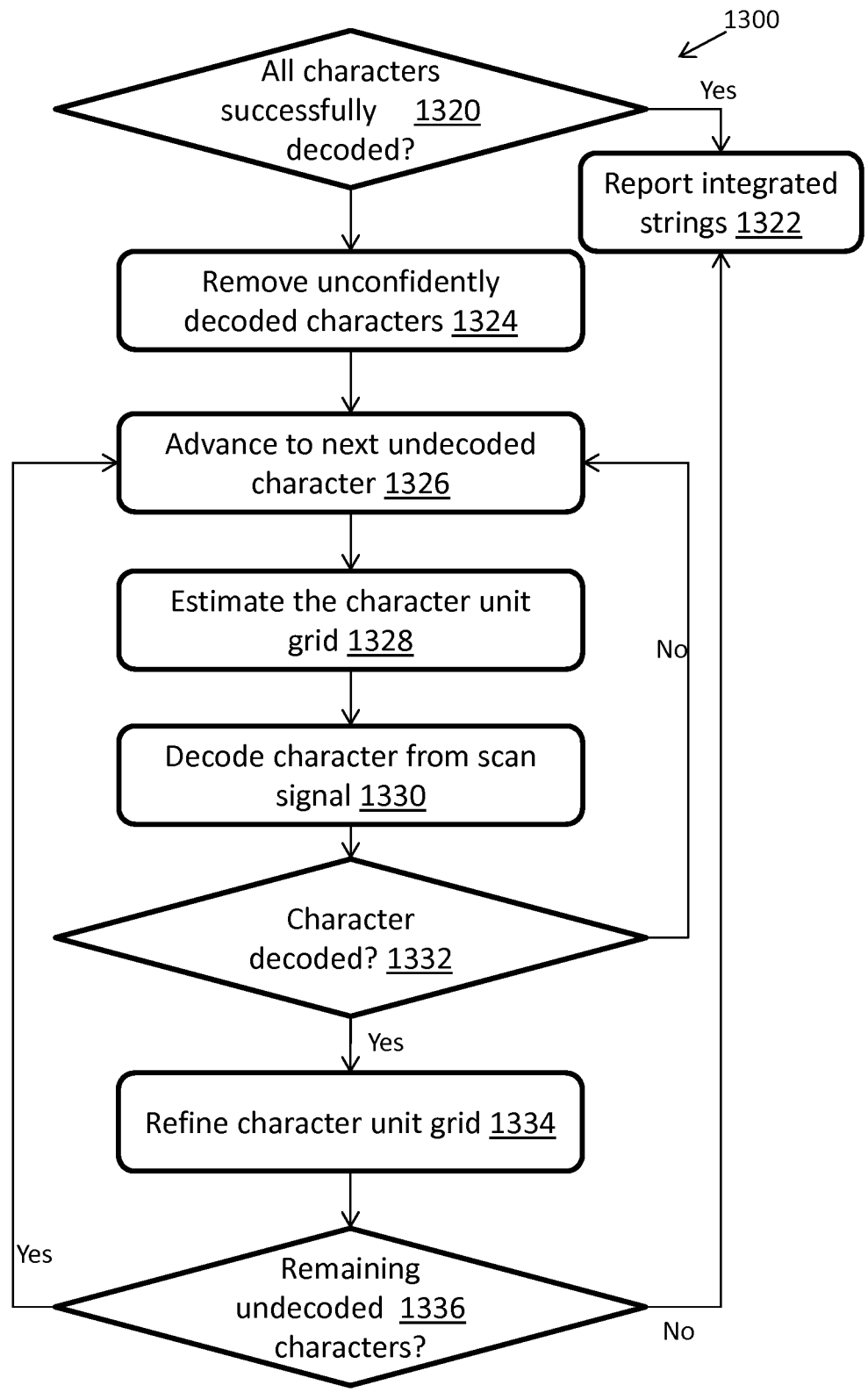

FIGS. 13A-B illustrate an exemplary computerized method 1300 for decoding a barcode from a scan signal, in accordance with some embodiments. At step 1302, the reader detects edges (e.g., 1D positions of transitions between elements) in the scan signal. One of skill in the art can appreciate that various techniques can be used to detect edges, such as using derivative peaks, second derivative zero crossings, peak/valley transitions (ANSI edges), and/or other edge detection methods. At step 1304, the reader filters the edges. For example, the reader can filter out false edges (e.g. based on contrast), and/or add missing edges when a minimum feature size is known. At step 1306, the reader locates and decodes the first delimiter character. In some embodiments, the reader can locate and decode the delimiter character in the reverse direction along the scan (e.g., by reversing the scan signal).

At step 1308, the reader advances to the next character position. For example, the reader can add the measured character length of the current character (e.g., which at the start from step 1306 will be the delimiter pattern), plus any measured inter-character gap, to determine the starting position of the current character. If the current character wasn't properly decoded (e.g., not within confidence ranges), the reader can use estimates of the character size. At step 1310, the reader estimates the character unit grid. In some embodiments, the character unit grid includes the starting position (e.g., phase), minimum feature size (e.g., X), wide/narrow ratio (if applicable), and inter-character gap. In some embodiments, the reader can be configured to use the last measured statistics of the previous decoded character, accounting for the number of characters that could not be decoded afterwards. In some embodiments, the inter-character gap for the first character beyond the delimiter can be measured using the first edge distance.

At step 1312, the reader decodes the character using edges. One of skill in the art can appreciate that this can be performed using techniques known in the art, such as by measuring edge-to-similar-edge distances, classifying the edge-to-similar-edge distances (e.g., including rounding each edge distance to the nearest integer multiple of X or W), looking up the character value, and updating the character grid (e.g., including the position, minimum feature size, and element width) and score (e.g., to update how well the edges matched, such as by using the fractional differences from the nearest integer multiples of X). At step 1314, the reader determines whether the last delimiter character was decoded or, whether the max number of characters was exceeded for the symbology. If not, the method proceeds back to step 1308. Otherwise, the method proceeds to step 1320 of FIG. 13B. At step 1320, the reader determines whether all characters were successfully decoded. If yes, the method 1300 proceeds to step 1322 and reports the integrated strings. If not, the method 1300 proceeds to step 1324 to remove unconfidently decoded characters. For example, the reader can be configured to avoid misreads. The reader can be set with a high confidence threshold to detect potential misreads (e.g., so such characters are marked as undecoded). For example, such characters may include those characters prior to undecoded characters (e.g., due to errors in character unit grid estimates and/or missing and/or extra edges).

At step 1326, the reader advances to the next undecoded character. For example, the reader can start at the beginning of the character string, and advance forward to the next undecoded character. At step 1328, the reader estimates the character unit grid. At step 1330, the reader decodes the character from the scan signal. If the character is not decoded, the method proceeds back to step 1326. If the character is decoded, the method proceeds to step 1334 and refines the character unit grid. In some embodiments, step 1334 is optional. The reader can search through small perturbations in each of the character unit grid measurements and assess how the score changes for the decoded character. The reader can select the character unit grid that yields the best score, thereby determining a modified start position, inter-character gap (if applicable), minimum feature size, and/or wide-to-narrow ratio (if applicable). If there are remaining undecoded characters, the method proceeds to step 1326. Otherwise the method proceeds to step 1322 and reports the integrated strings.

Referring to step 1330, decoding separate characters can, for example, accommodate a varying scan sampling pitch as a function of position along the scan, such as that caused by optical perspective effects and/or non-linear warping of the symbol around curved objects. Therefore a barcode reader can be configured to use a constant scan sampling pitch over the relatively small positional range of a character. A single minimum feature size and wide bar width (if applicable), e.g., measured in scan sample pitch units, can be used to describe the unit grid for a character. Advantageously, using characters can also allow a barcode reader to solve for each character unit encodation pattern by examining all possible combinations of unit encodation patterns (e.g., 103 combinations for multiple-width Code128) and choosing the unit encodation pattern that results in an expected (e.g., predicted) normalized scan samples, Ab, that is the closest match for the portion of the measured normalized scan samples, s.

In some embodiments a barcode reader can be configured to directly solve for the unit encodation pattern using standard linear algebra techniques (e.g. using the standard least squares formulation $b=(A^T A)^{-1}s$, which would minimize the Euclidean length of Ab−s). A may become numerically unstable as the module size approaches 1.0, and below 1.0 A becomes singular. Therefore techniques can be used to stabilize the solution. For example, constraint minimization (e.g. using Lagrange multipliers to incorporate some other linear constraint) can be used to stabilize the solution. As another example, the psuedoinverse (e.g. $b=A^+s$) can be used to stabilize the solution. The solution can be constrained in any of a number of other ways, for example, mathematically constraining the solution to be a binary vector. However, some constraints may be less beneficial than others, as they may result in a non-linear set of equations that are not easily or efficiently solved.

A character-by-character technique can be used to decode two-width barcodes and/or to decode multiple-width characters (e.g., when using unit elements). A reader can therefore be configured to decode a barcode character by identifying the unit sampling coefficients matrix (e.g., and associated element width pattern and character value) that results in the best score (e.g., the one that essentially matches the sample scan the best) when multiplied by a binary unit encodation pattern vector representing alternating bars and spaces (same for all possible characters).

In some embodiments, the barcode reader determines the scan signal envelope vectors l and H prior to and/or during the process finding the best match character (e.g., so that the measured and predicted (expected) scan signal values can be directly compared). In some embodiments, the barcode reader is configured to assume that the scan signal envelope is constant over a single character (e.g., to make the computations easier). For example, a barcode reader can use a single pair of envelope values, l and h, rather than a vector. For example, such a configuration can be used to essentially assume that the underlying lighting of the barcode doesn't change much over the course of a single character.

In some embodiments, the barcode reader can be configured to assume that the signal envelope is not much different than that of the previously decoded character. After decoding, the barcode reader can refine the envelope by measuring the minimum and maximum signal values within the wider bars of the decoded character. In some embodiments, the barcode reader can determine the envelope parameters l and h directly for each possible character as part of the matching process. For example, the barcode reader can be configured to matching the expected Ab directly against the actual measured raw signal r (e.g., by allowing an arbitrary uniform scale and single offset). In some embodiments, the barcode reader can be configured to select the values of scalars a and c that minimize $\sum_i (a\, r(i)+c-s(i))^2$ (e.g., the sum over all n values of i, where n is the length of the portion of the scan signal). The relationships $a=(S-B)/(h-l)$ and $c=B-al$ can then be used to determine h and l, which yields:

$$l=(DB-v_c)/v_a$$

$$h=l+D(S-B)/v_a \qquad \text{Equations 3 and 4}$$

where:

$$v_a = m_2 y_2 - n y_1$$

$$v_c = m_2 y_1 - m_1 y_2$$

$$D = m_2^2 - n m_1$$

$$m_1 = \text{sum}(r(i)^2)$$

$$m_2 = \text{sum}(r(i))$$

$$y_1 = \text{sum}(s(i)r(i))$$

$$y_2 = \text{sum}(s(i))$$

In some embodiments, the barcode reader can be configured to verify computed l and h against expected ranges for these numbers (e.g. based on nearby characters) so that the barcode reader can determine whether the character corresponding to b should be considered further.

Figure 14A:
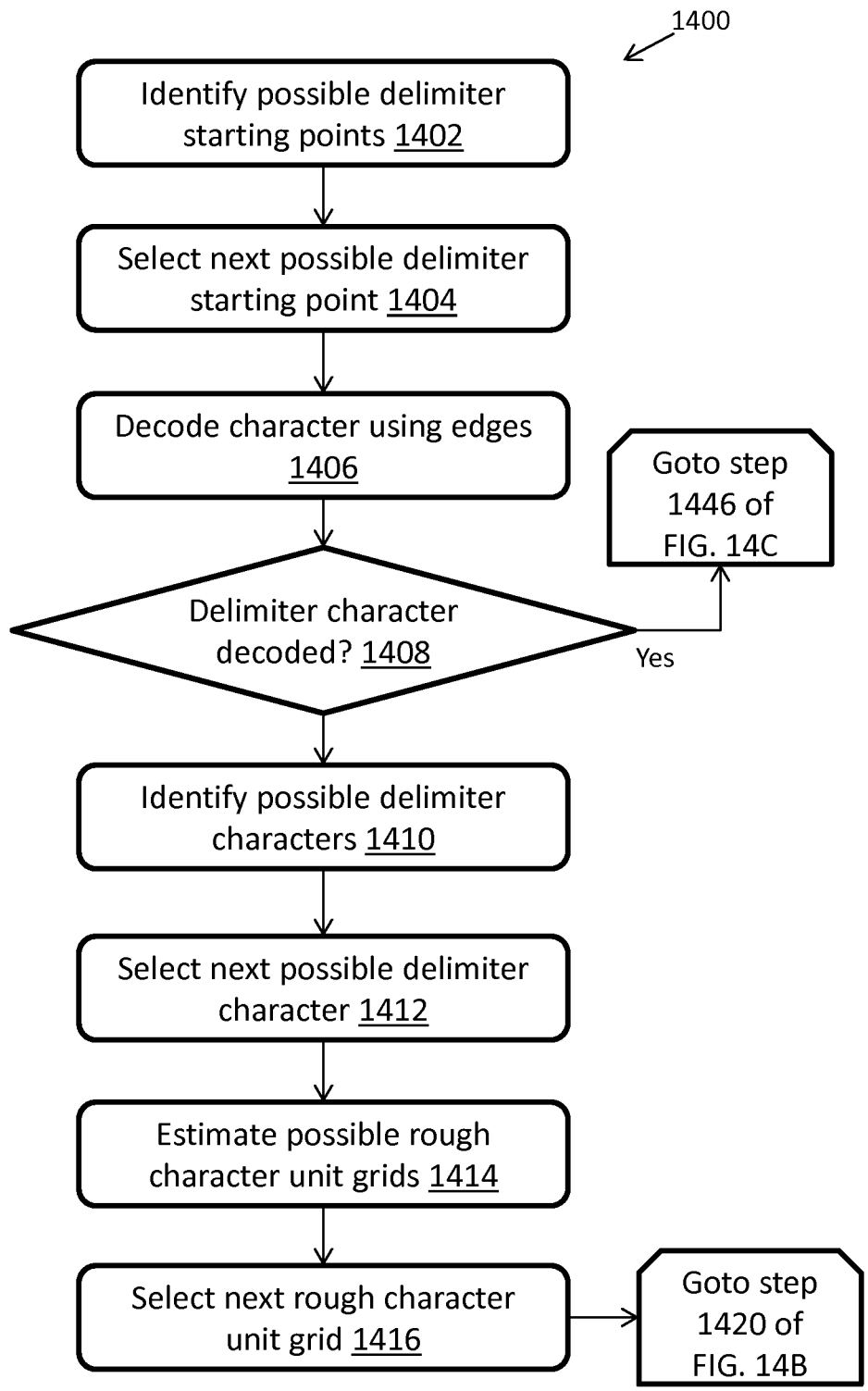
FIGS. 14A-C illustrate an exemplary computerized method for locating and decoding a first delimiter character for decoding barcodes, in accordance with some embodiments.
Figure 14B:
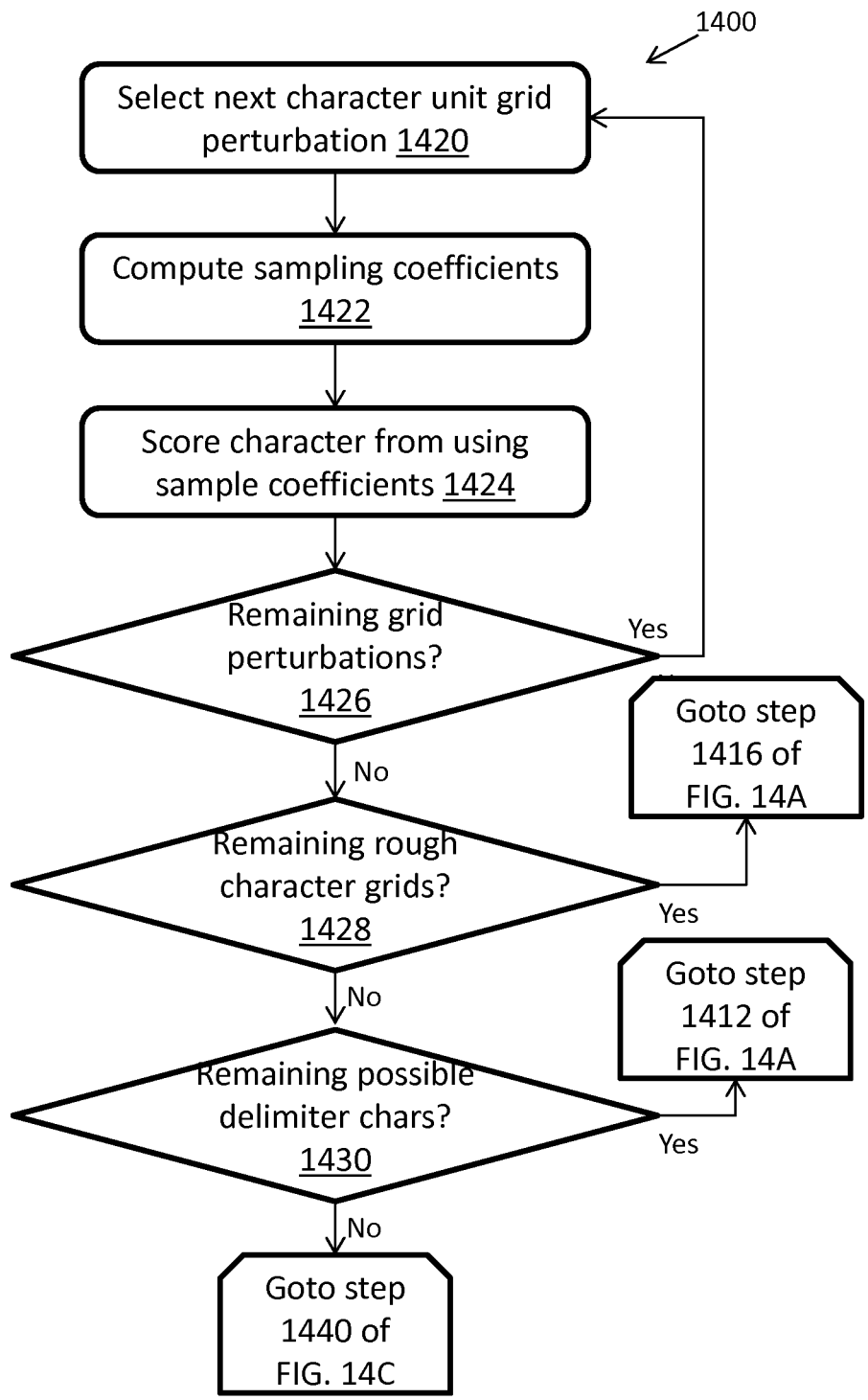
Figure 14C:
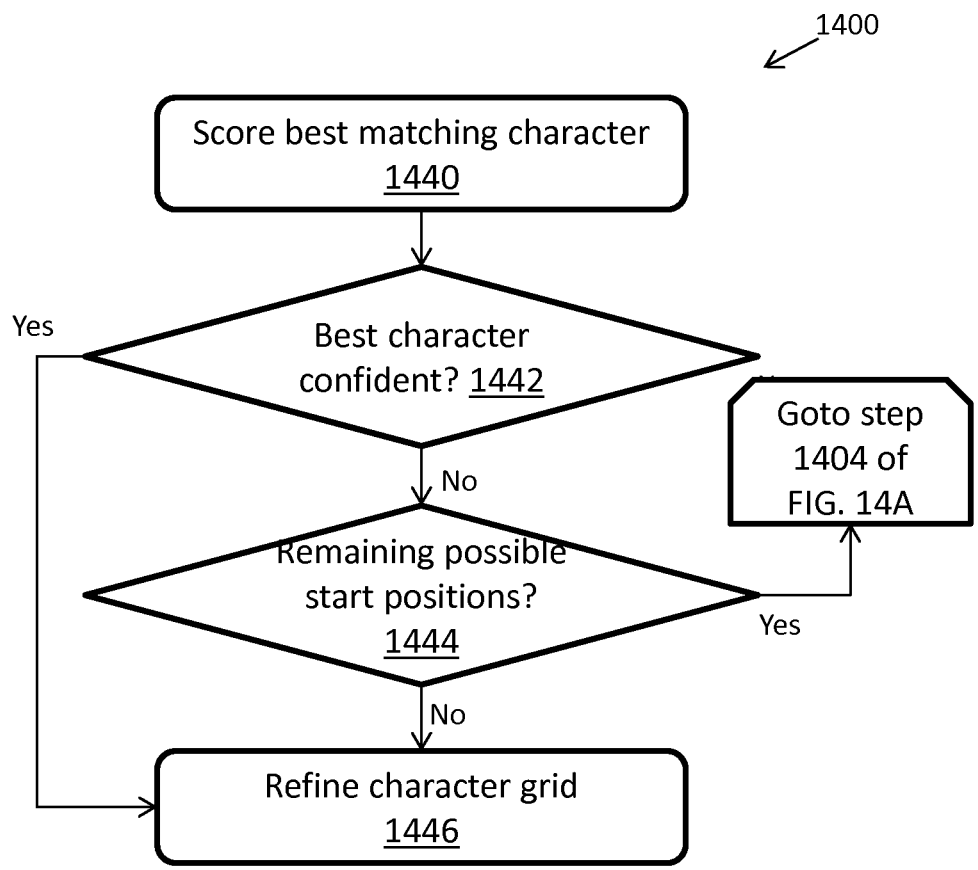

FIGS. 14A-C illustrate an exemplary computerized method 1400 for locating and decoding a first delimiter character for decoding barcodes, in accordance with some embodiments. At step 1402, the reader identifies possible delimiter starting points. For example, the reader can consider each edge as a possible starting location, where the polarity of the edge (light-to-dark or dark-to-light) determines the polarity of the barcode (light-on-dark or dark-on-light). As another example, the reader can consider only edges with reasonable quiet zones (e.g., with no significant features (e.g. edges) in the scan signal prior for a distance relative to the subsequent edge distance).

At step 1404, the reader selects the next possible delimiter starting point from among the remaining identified possible delimiter starting points. At step 1406, the reader decodes the character using edges. At step 1408, the method 1400 determines whether the delimiter character was decoded. If yes, the method proceeds to step 1446 in FIG. 14C. at step 1410, the reader identifies possible delimiter characters. For example, some symbologies have more than one start or stop pattern. In some embodiments as described above, stop patterns can be detected in the reverse direction along the scan signal, since the decoding operation may be occurring in the reverse direction. At step 1412 the reader selects the next possible delimiter character.

At step 1414, the reader estimates possible rough character unit grids. For example, the reader can estimate the possible minimum feature sizes, and wide/narrow ratio (if applicable), from a portion of the signal at the end of the barcode. For example, the reader can estimate that the print growth is roughly 0, and that the inter-character gap (if applicable) is 1×. Other estimates can be made by, for example, identifying possible measured edge to start pattern edge correspondences, assuming some edges may be missing due to the fact that the signal is unresolved, and performing a least squares fit. The correspondences with the best fit (e.g., above an error threshold) are chosen and associated with a best fit character grid. In some embodiments, for two-width symbologies, estimation can alternatively be accomplished without edges by locating the centers of the wide elements and performing a similar correspondence operation.

At step 1416, the reader selects a next rough character unit grid, and the method proceeds to step 1420. At step 1420, the reader selects the next character unit grid perturbation. For example, the reader can select the character unit grid that differs from the estimate, but is within the estimated maximum error. In some embodiments, the reader can vary one parameter (e.g., such as minimum feature size) in small steps. At step 1422, the reader computes the unit sampling coefficients matrix, which is described further in FIG. 15. At step 1424, the reader scores the character from the unit sampling coefficients matrix, which is described further in FIG. 16. If the reader determines that the score is sufficient (e.g. better than a predetermined threshold), the reader can record the score for that character, and the associated character unit grid.

At step 1426, the reader determines whether there are any remaining grid perturbations. If there are remaining grid perturbations, the reader proceeds to step 1420. If no, the method proceeds to step 1428 and determines whether there are any remaining rough character grids. If character grids remain, the method proceeds to step 1416 in FIG. 14A. If no character grids remain, the method proceeds to step 1430 and determines whether there are remaining possible delimiter characters. If there are remaining possible delimiter characters, the method proceeds to step 1412 of FIG. 14A.

If there are no remaining possible delimiter characters, the method proceeds to step 1440 of FIG. 14C. At step 1440, the reader scores the best matching character. For example, the reader can select the character/grid combination with the best score. At step 1442, the reader determines whether the best character score is sufficient. For example, if the best-matching character score is not good enough, or is not better than the next best possible character score by more than the confidence threshold, the reader can determine it has not found a delimiter character. If the best character score is sufficient, the reader proceeds to step 1446. If the best character score is not sufficient, the reader proceeds to step 1444 and determines whether there are remaining possible delimiter start positions. If there are remaining possible delimiter start positions, the method proceeds to step 1404 in FIG. 14A. If there are not remaining possible delimiter start positions, the method proceeds to step 1446 and (optionally) refines the character grid. For example, the reader can search through small perturbations in each of the character grid measurements and assess how the score changes for the decoded character. In some embodiments, the reader chooses the character grid that yields the best score, thereby determining a modified start position, inter-character gap (if applicable), minimum feature size, and/or wide-to-narrow ratio (if applicable).

Figure 15:
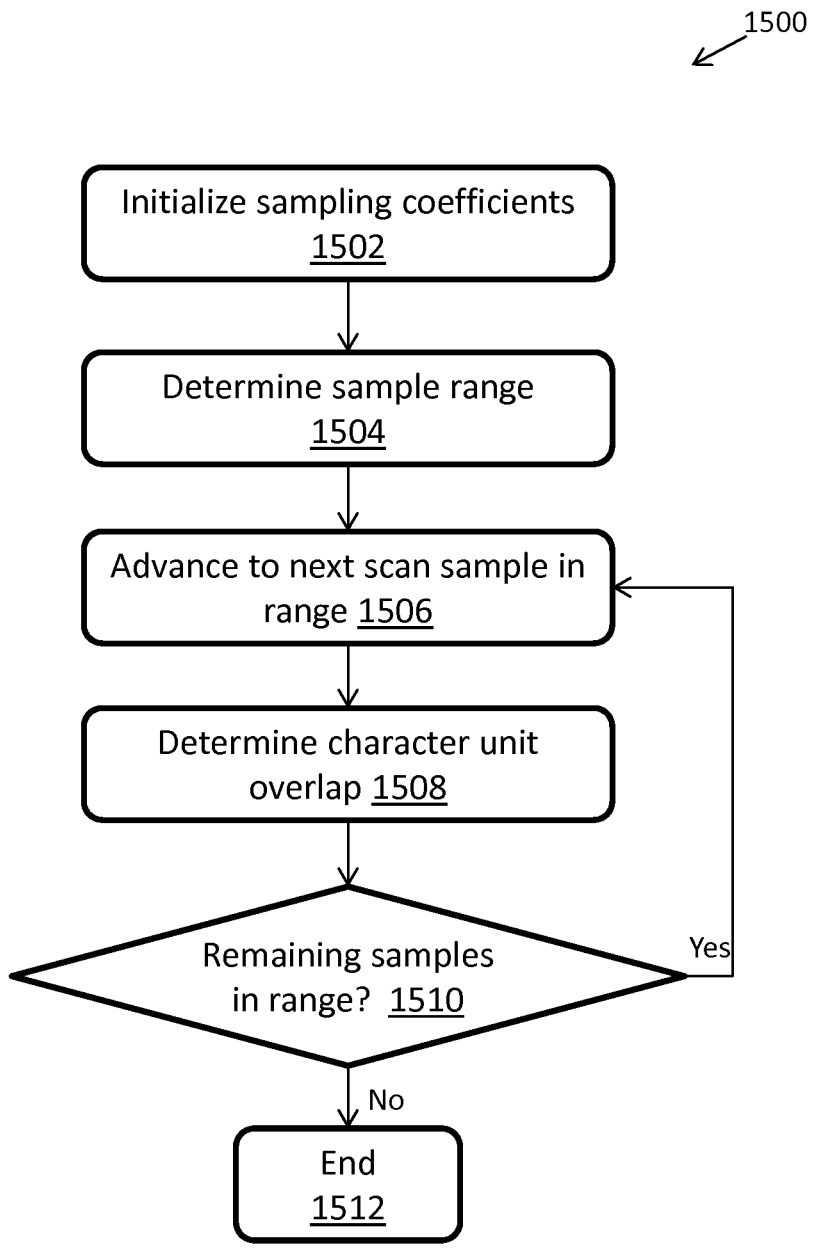
FIG. 15 illustrates an exemplary computerized method for determining a unit sampling coefficients for decoding barcodes, in accordance with some embodiments.

FIG. 15 illustrates an exemplary computerized method 1500 for determining a unit sampling coefficients for decoding barcodes, in accordance with some embodiments. At step 1502, the reader initializes the unit sampling coefficients. The unit sampling coefficients matrix is of size n×m, where n is the number of actual 1D signal values, and m is either the number of modules (e.g., for a multiple-width symbol) or elements (e.g., for a two-width symbol, or multiple-width with element units) in a character, plus 2 (e.g., representing the elements or inter-character gaps before and after the character). The reader initializes all values to 0. In a preferred embodiment, the coefficients matrix is represented using a sparse matrix representation.

At step 1504, the reader determines the sample range. For example, the reader can determine the first and last samples with centers that lie within the character (e.g., centers within one of the character modules or elements, and not the previous to or following element or inter-character gap). At step 1506, the reader advances to the next scan sample in range. For example, this is the first sample in range if none has yet been considered. As described above, the sample can correspond to a row of the coefficients matrix with the same index. The sample is typically associated with a bin, which is a positional range of the scan line over which it is assumed to integrate information. A sample bin can be centered about the sample position, and can have a width equal to the sample spacing.

At step 1508, the reader determines the character unit overlap. For example, using the character unit grid, the reader computes the percentage of the sample bin that is overlapped by each character unit (e.g., taking print growth, g, into account). For multiple-width symbols, the reader can use units equal to modules. For two-width symbols, the reader can use units equal to elements. The reader can record these values in order across the row of the coefficients matrix associated with the sample. In some embodiments, when the X−g>0.5 sample pitches, there are likely at most three non-zero percentages per row, and overlap can be determined by locating the closest module i to the sample j, and setting the coefficients matrix A according to the equations:

$$q(i)=(w(i)-1)/2$$

$$A(j,i-1)=\max(+d(i,j)-q(i)+g/2,0)$$

$$A(j,i+1)=\max(-d(i,j)-q(i)+g/2,0)$$

$$A(j,i)=1-A(j,i-1)-A(j,i+1) \qquad \text{(Equations 5-8)}$$

Where:
w(i) is the width of element i (e.g., which is X for narrow elements or modules, or W for wide elements); and
d(i,j) is the signed difference between the center of unit i and the center of sample j (e.g., where all positions are real values in sample coordinates).

At step 1510, the reader determines whether there are any remaining scan samples in range. If there are remaining scan samples in range, the method proceeds to step 1506. If there are no further remaining scan samples in range, the method proceeds to step 1512 and terminates.

In some embodiments, the barcode reader is configured to determine the score for a character using a function of the errors, e=s−Ab. Examples of this function include the sum of the squared errors, the sum of the absolute errors, the maximum error, and/or the like. In some embodiments, the errors are "back-propagated" through the coefficients matrix to compute errors in the original character units (modules or elements). Back-propagation can be accomplished by computing a unit error vector e(b) according to the following equation:

$$e(b)=A^T e' \qquad \text{Equation 9}$$

where:
e(b) is the unit error vector; and
e' is the vector of absolute signal errors, defined by e'(i)=|e(i)|.

The overall error for the pattern b can be computed, for example, using the sum of the squared unit errors, the sum of the unit errors, the maximum unit error, and/or the like. In some embodiments, the sum of the squared unit errors is used for data characters (e.g., since getting even a single unit incorrect can result in a costly misread). In some embodiments, the sum of the unit errors is used for delimiters (e.g., where misreads are not as detrimental, but missing a delimiter can result in not even attempting to decode a symbol).

Figure 16:
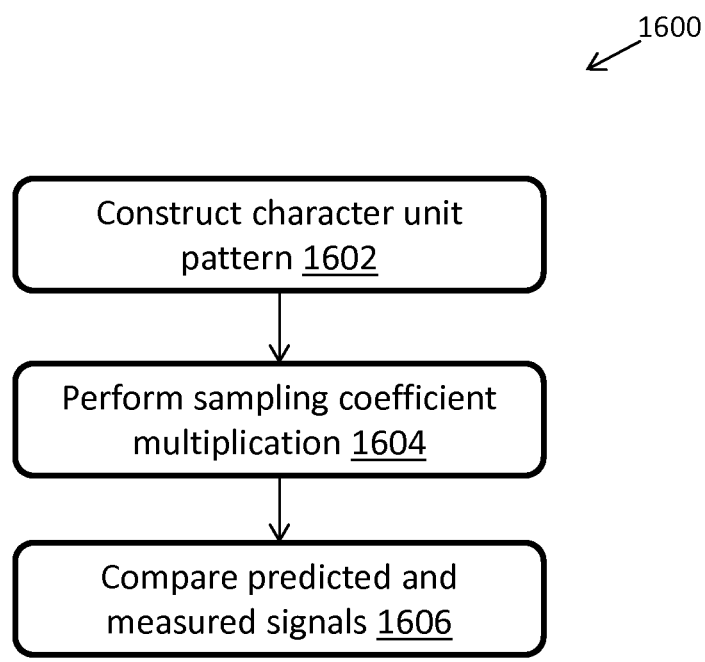
FIG. 16 illustrates an exemplary computerized method for scoring a character from a scan signal for decoding barcodes, in accordance with some embodiments.

FIG. 16 illustrates an exemplary computerized method 1600 for scoring a character from a scan signal for decoding barcodes, in accordance with some embodiments. At step 1602, the reader constructs a character unit pattern. For example, in some embodiments the reader identifies the binary unit encoding pattern associated with the character. For example, for multiple-width characters the unit encoding pattern is the pattern of modules that can be part of bars or spaces, derived from the character element width pattern. For two-width characters, for example, the unit encodation pattern is the pattern of element values that is always an alternating sequence of bar and space values, starting with the appropriate value (bar or space).

At step 1604, the reader performs unit sampling coefficient multiplication. For example, the reader can multiply the unit sampling coefficients matrix by the unit encodation pattern to obtain the predicted (or expected) signal vector. At step 1606, the reader can compare the predicted and measured signals. In some embodiments, the reader can be configured such that the comparison should produce one or more character scores that indicates how well the predicted signal matches the measured signal. This can be accomplished in a variety of ways, as previously described. In some embodiments, the reader can subtract the two values after normalizing the actual signal by the local signal envelope (e.g., the minimum and maximum signal range, corresponding to the apparent reflectance of the bars and spaces in the signal).

Figure 17:
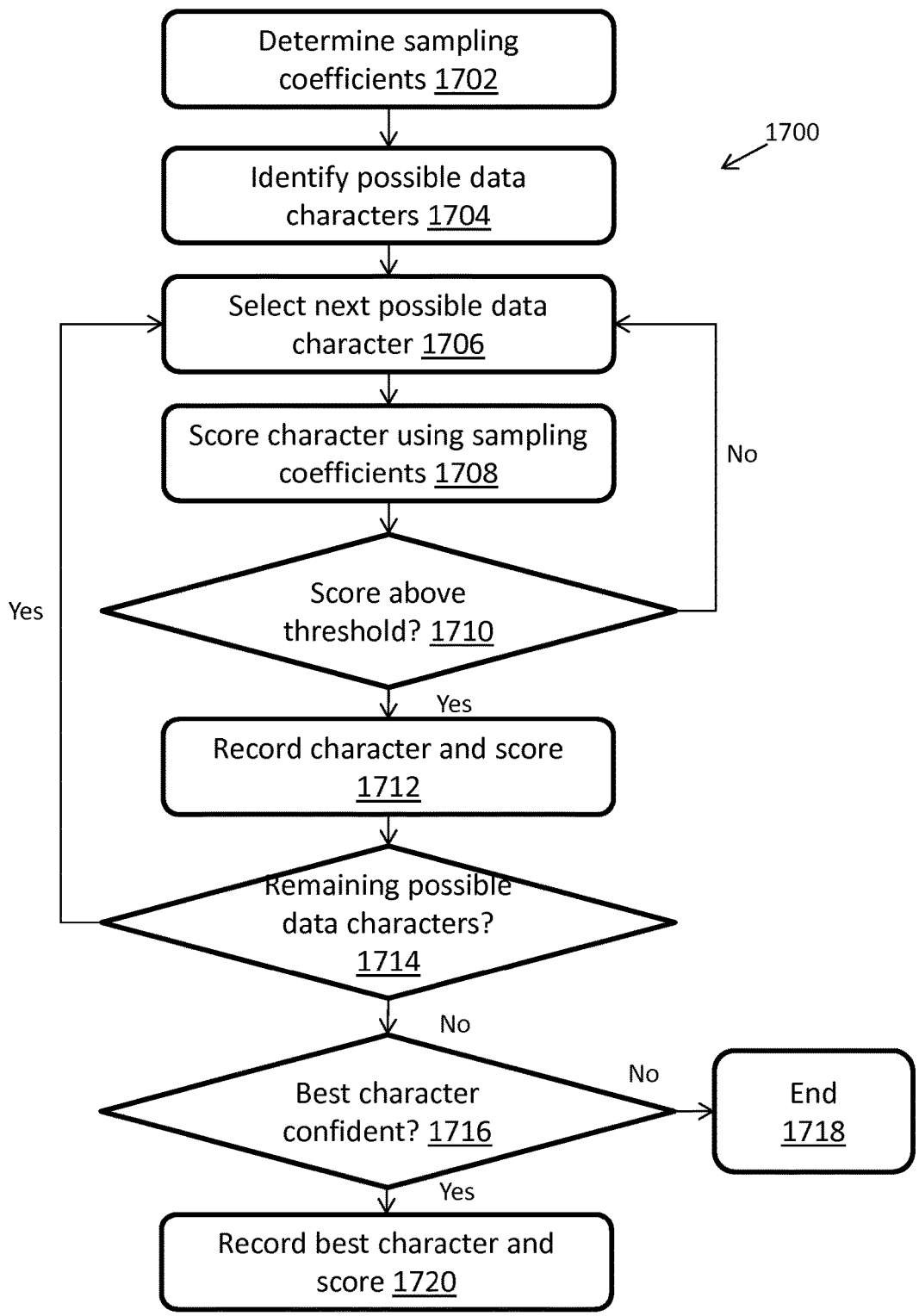
FIG. 17 illustrates an exemplary computerized method for decoding a character from a scan signal of a multi-width barcode for decoding the barcode, in accordance with some embodiments.

FIG. 17 illustrates an exemplary computerized method 1700 for decoding a character from a scan signal of a multi-level barcode for decoding the barcode, in accordance with some embodiments. Referring to step 1702, the reader determines the unit sampling coefficients, e.g., as explained in FIG. 16. At step 1704, the reader identifies possible data characters. For example, for some codes like Code128, all data characters might be possible. For other codes, like UPC-EAN, only characters from the appropriate sub-groups (A, B, or C) might be possible. At step 1706, the reader selects the next possible data character. At step 1708, the reader scores the character using the unit sampling coefficients.

At step 1710, the reader determines whether the score is high enough. If the score is not high enough, the method proceeds to step 1706. If the score is high enough, the reader proceeds to step 1712 and records the character and score. At step 1714, the reader determines whether there are remaining possible data characters. If there are remaining possible data characters, the reader proceeds to step 1706. If there are not any remaining possible data characters, the reader proceeds to step 1716 and the reader determines whether the best score is better than the second best score (if any) by at least the confidence threshold. If the reader is confident that it identified the best character, the reader proceeds to step 1720 and records the best character and score. If the reader is not confident, then the character is not decoded.

Figure 18:
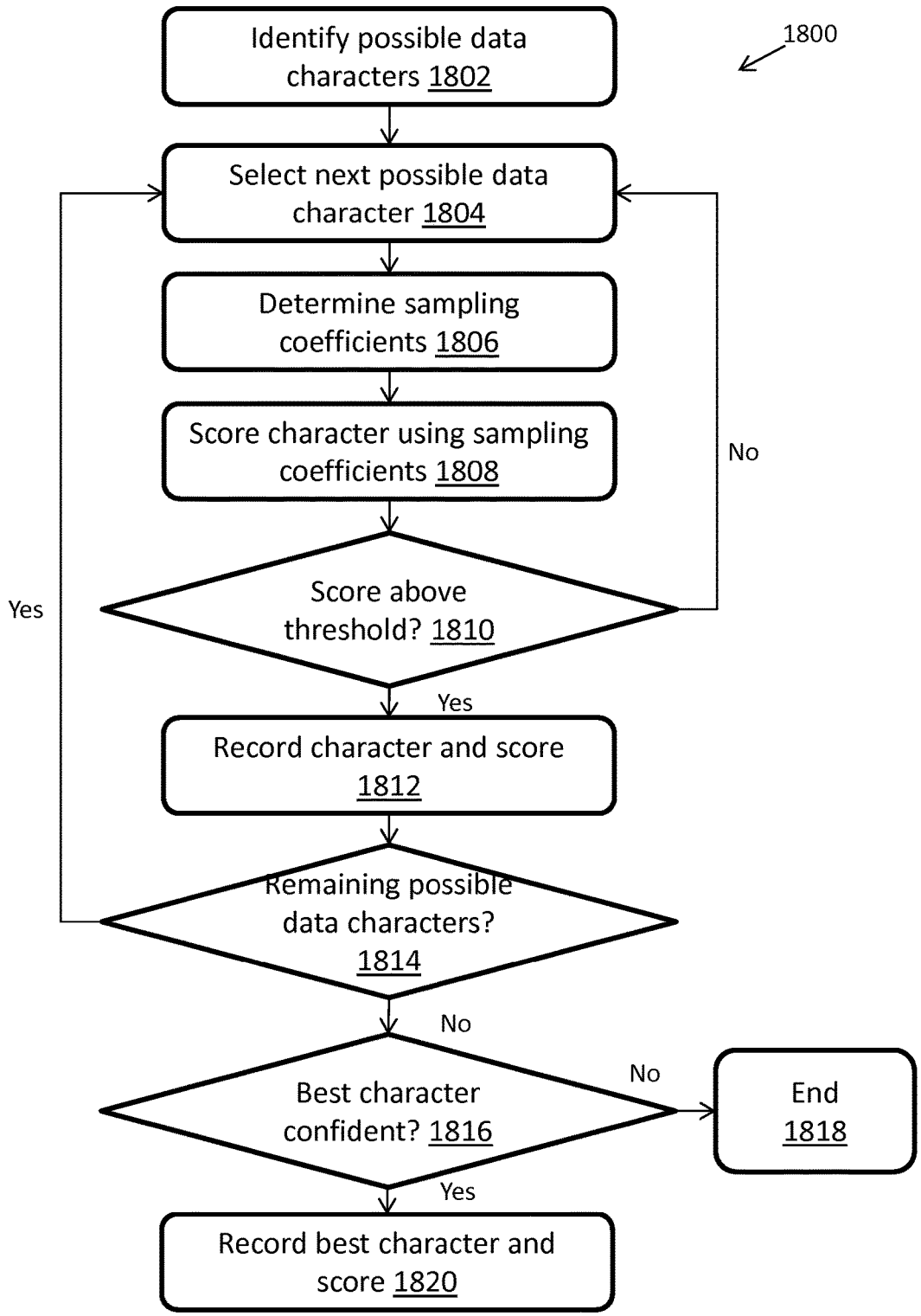
FIG. 18 illustrates an exemplary computerized method for decoding a character from a scan signal of a two-width or multi-width barcode for decoding the barcode, in accordance with some embodiments.

FIG. 18 illustrates an exemplary computerized method 1800 for decoding a character from a scan signal of a two-level or multi-level barcode for decoding the barcode, in accordance with some embodiments. At step 1802, the method identifies possible data characters. For example, for some codes like Code39, all data characters might be possible. For other codes, like Codabar, only characters with the appropriate length might be possible. At step 1804, the method selects the next possible data character. At step 1806, the method determines the unit sampling coefficients (e.g., as described in conjunction with FIG. 15). At step 1808, the method scores the character using the unit sampling coefficients (e.g., as described in conjunction with FIG. 16).

At step 1810, the reader determines whether the score is above a predetermined threshold. If the score is not above a predetermined threshold, the method proceeds back to step 1804. If the score is above a predetermined threshold, the method proceeds to step 1812 and records the character and score. At step 1814, the method determines whether there are remaining possible data characters. If there are remaining possible data characters, the method proceeds to step 1804. If there are not remaining possible data characters, the method proceeds to step 1816. At step 1816, the reader determines whether the best score is better than the second best score (if any) by at least the confidence threshold. If the reader is confident that it identified the best character, the reader proceeds to step 1820 and records the best character and score. If the reader is not confident, then the character is not decoded and the method terminates at step 1818.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for decoding a barcode, the method comprising:

receiving, by a computing device, data from a sensor indicative of a scan signal along a scan through a barcode;

determining, by the computing device, a set of barcode units of the barcode along the scan, wherein each barcode unit from the set of barcode units comprises a width and a binary encoding value;

determining, by the computing device, based on the set of barcode units of, at least one set of sampling coefficients relating the set of barcode units to a portion of the scan signal by determining coefficients representing relative contributions of each barcode unit of the set of barcode units to each scan sample of a set of scan samples in the portion of the scan signal; and determining, by the computing device, an element pattern for the set of barcode units based on the at least one set of sampling coefficients and the portion of the scan signal.

2. The method of claim 1, wherein the set of barcode units comprises at least one of a starting position of the set of barcode units, a minimum feature size for the barcode, a wide/narrow ratio for the barcode, and an inter-character gap for the barcode.

3. The method of claim 1, wherein determining the set of barcode units comprises locating at least one character, comprising:
   detecting barcode element edges along the scan using the scan signal;
   classifying distances between the detected barcode element edges; and
   determining the element width pattern and the set of barcode units based on the classified distances between the detected barcode element edges.

4. The method of claim 1, wherein determining the set of barcode units comprises:
   detecting barcode element edges along the scan using the scan signal; and
   locating a first barcode element edge along the scan based on the detected barcode element edges.

5. The method of claim 1, wherein determining the set of barcode units comprises locating a delimiter character, comprising:
   detecting barcode element edges along the scan using the scan signal;
   locating a first barcode element edge and a second barcode element edge of the delimiter character along the scan based on the detected barcode element edges;
   constraining at least one attribute of the set of barcode units based on a distance between the first barcode element edge and the second barcode element edge, a number of units between the first barcode element edge and the second barcode element edge, or both.

6. The method of claim 1, wherein determining the set of barcode units comprises:
   locating a position of at least one wide barcode element along the scan;
   detecting barcode element edges along the scan using the scan signal;
   locating a first barcode element edge along the scan based on the detected barcode element edges; and
   constraining at least one attribute of the set of barcode units based on a distance between the first barcode element edge and the at least one wide barcode element position, a number of units between the first barcode element edge and the at least one wide barcode element position, or both.

7. The method of claim 1, wherein the barcode is:
   a two-width barcode and barcode units for the set of barcode units are elements of the two-width barcode;
   a multiple-width barcode and units for the set of barcode units are elements of the multiple-width barcode;
   a multiple-width barcode and units for the set of barcode units are modules of the multiple-width barcode, or any combination thereof.

8. The method of claim 1, further comprising determining a relative contribution of each barcode unit to a corresponding scan sample based on an amount of overlap between the barcode unit and a scan sample bin corresponding to the scan sample.

9. The method of claim 1, wherein determining the element width pattern for the set of barcode units comprises:
   determining a unit encodation pattern for the set of barcode units by solving a linear matrix equation with a left hand side of the linear matrix equation equal to a matrix of the at least one set of sampling coefficients multiplied by the unit encodation pattern and a right hand side of the linear matrix equation equal to a vector function of the portion of the scan signal; and
   converting the unit encodation pattern to an element width pattern.

10. The method of claim 9, further comprising determining a signal envelope, comprising:
   determining the signal envelope based on measurements made for a nearby barcode character in the scan signal;
   determining the signal envelope by measuring maximum and minimum scan signal values over a portion of the scan signal;
   determining the signal envelope separately for each possible unit encodation pattern;
   determining the signal envelope for at least one unit encodation pattern by minimizing a fit error that is a function of a vector difference between a vector left side of the linear matrix equation and a vector function of the portion of the scan signal, wherein the vector function is a normalization function that normalizes for the signal envelope, or any combination thereof.

11. The method of claim 9, wherein solving the linear matrix equation comprises:
   computing a score for each of a set of possible unit encodation patterns; and
   selecting from the set of possible unit encodation patterns the unit encodation pattern having the best score, comprising:
      comparing the score for each unit encodation pattern to a score threshold;
      comparing the score for a first unit encodation pattern and the score for second unit encodation pattern from the set of possible unit encodation patterns; or both.

12. A barcode reader for decoding a barcode, the barcode reader comprising a processor configured to run a module stored in memory that is configured to cause the processor to:
   receive data from a sensor indicative of a scan signal along a scan through a barcode;
   determine a set of barcode units of the barcode along the scan, wherein each barcode unit from the set of barcode units comprises a width and a binary encoding value;
   determine, based on the set of barcode units, at least one set of sampling coefficients relating the set of barcode units to a portion of the scan signal by determining coefficients representing relative contributions of each barcode unit of the set of barcode units to each scan sample of a set of scan samples in the portion of the scan signal; and
   determine an element pattern for the set of barcode units based on the at least one set of sampling coefficients and the portion of the scan signal.

13. The barcode reader of claim 12, wherein determining the set of barcode units comprises locating at least one character, comprising:
   detecting barcode element edges along the scan using the scan signal;

classifying distances between the detected barcode element edges; and determining the element width pattern and the set of barcode units based on the classified distances between the detected barcode element edges.

14. The barcode reader of claim 12, wherein determining the set of barcode units comprises:

detecting barcode element edges along the scan using the scan signal; and locating a first barcode element edge along the scan based on the detected barcode element edges.

15. The barcode reader of claim 12, wherein determining the set of barcode units comprises locating a delimiter character, comprising:

detecting barcode element edges along the scan using the scan signal;

locating a first barcode element edge and a second barcode element edge of the delimiter character along the scan based on the detected barcode element edges;

constraining at least one attribute of the set of barcode units based on a distance between the first barcode element edge and the second barcode element edge, a number of units between the first barcode element edge and the second barcode element edge, or both.

16. The barcode reader of claim 12, wherein determining the set of barcode units comprises:

locating a position of at least one wide barcode element along the scan;

detecting barcode element edges along the scan using the scan signal;

locating a first barcode element edge along the scan based on the detected barcode element edges; and constraining at least one attribute of the set of barcode units based on a distance between the first barcode element edge and the at least one wide barcode element position, a number of units between the first barcode element edge and the at least one wide barcode element position, or both.

17. The barcode reader of claim 12, the processor further configured to determine a relative contribution of each barcode unit to a corresponding scan sample based on an amount of overlap between the barcode unit and a scan sample bin corresponding to the scan sample.

18. The barcode reader of claim 12, wherein determining the element width pattern for the set of barcode units comprises:

determining a unit encoding pattern for the set of barcode units by solving a linear matrix equation with a left hand side of the linear matrix equation equal to a matrix of the at least one set of sampling coefficients multiplied by the unit encoding pattern and a right hand side of the linear matrix equation equal to a vector function of the portion of the scan signal; and converting the unit encoding pattern to an element width pattern.

19. The barcode reader of claim 18, wherein solving the linear matrix equation comprises:

computing a score for each of a set of possible unit encoding patterns; and selecting from the set of possible unit encoding patterns the unit encoding pattern having the best score, comprising:

comparing at least one score for a one unit encoding pattern to a score threshold;

comparing the score for each first unit encoding pattern and the score for second unit encoding pattern from the set of possible unit encoding patterns, or any combination thereof.

20. A non-transitory computer readable medium having executable instructions operable to cause an apparatus to:

receive data from a sensor indicative of a scan signal along a scan through a barcode;

determine a set of barcode units the barcode along the scan, wherein each barcode unit from the set of barcode units comprises a width and a binary encoding value;

determine based on the set of barcode units, at least one set of sampling coefficients relating the set of barcode units to a portion of the scan signal by determining coefficients representing relative contributions of each barcode unit of the set of barcode units to each scan sample of a set of scan samples in the portion of the scan signal; and determine an element pattern for the set of barcode units based on the at least one set of sampling coefficients and the portion of the scan signal.

21. A computerized method for decoding a two-width barcode, the method comprising:

receiving, by a computing device, data from a sensor indicative of a scan signal along a scan through a two-width barcode;

determining, by the computing device, an element grid for an element pattern within the two-width barcode along the scan, wherein the element grid comprises at least one of a starting position of the element pattern, a minimum feature size for the barcode, a wide/narrow ratio for the barcode, and an inter-character gap for the barcode;

determining, by the computing device, based on the element grid, at least one set of sampling coefficients relating the element pattern to a portion of the scan signal by determining coefficients representing relative contributions of each element of the element pattern to each scan sample of a set of scan samples in the portion of the scan signal; and determining, by the computing device, a binary element width pattern for the element pattern based on the at least one set of sampling coefficients and the portion of the scan signal.

22. A computerized method for decoding a multiple-width barcode, the method comprising:

receiving, by a computing device, data from a sensor indicative of a scan signal along a scan through a multiple-width barcode;

determining, by the computing device, a module grid for a module pattern within the multiple-width barcode along the scan, wherein the module grid comprises at least one of a starting position of the module pattern, and a minimum feature size for the barcode;

determining, by the computing device, based on the module grid, a set of sampling coefficients relating the module pattern to a portion of the scan signal by determining coefficients representing relative contributions of each module of the module pattern to each scan sample of a set of scan samples in the portion of the scan signal; and determining, by the computing device, an element width pattern of integer module widths for the module pattern based on the set of sampling coefficients and the portion of the scan signal.

* * * * *